United States Patent
Zhao et al.

(10) Patent No.: US 11,394,477 B2
(45) Date of Patent: Jul. 19, 2022

(54) ELECTRONIC DEVICE, METHOD AND COMPUTER-READABLE STORAGE MEDIUM USED FOR WIRELESS COMMUNICATION

(71) Applicant: Sony Corporation, Tokyo (JP)

(72) Inventors: Youping Zhao, Beijing (CN); Yu Zhao, Beijing (CN); Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 89 days.

(21) Appl. No.: 16/765,168

(22) PCT Filed: Mar. 5, 2019

(86) PCT No.: PCT/CN2019/076931
§ 371 (c)(1),
(2) Date: May 19, 2020

(87) PCT Pub. No.: WO2019/170070
PCT Pub. Date: Sep. 12, 2019

(65) Prior Publication Data
US 2020/0343984 A1     Oct. 29, 2020

(30) Foreign Application Priority Data
Mar. 7, 2018 (CN) .......................... 201810186035.7

(51) Int. Cl.
*H04B 17/382* (2015.01)
*H04B 17/345* (2015.01)
(Continued)

(52) U.S. Cl.
CPC ......... *H04B 17/382* (2015.01); *H04B 17/345* (2015.01); *H04B 17/373* (2015.01); *H04W 16/10* (2013.01)

(58) Field of Classification Search
CPC .. H04B 17/382; H04B 17/345; H04B 17/373; H04W 16/10
See application file for complete search history.

(56) References Cited

U.S. PATENT DOCUMENTS 10,481,800 B1 * 11/2019 Pandian ................ G06F 3/0635
2004/0203897 A1 * 10/2004 Rogers .................. H04W 16/18
455/456.1
(Continued)

FOREIGN PATENT DOCUMENTS

CN           101635932 A     1/2010
CN           101877608 A    11/2010
(Continued)

OTHER PUBLICATIONS

International Search Report and Written Opinion dated May 6, 2019 for PCT/CN2019/076931 filed on Mar. 5, 2019, 8 pages including English Translation of the International Search Report.

*Primary Examiner* — Samina F Choudhry
(74) *Attorney, Agent, or Firm* — Xsensus LLP

(57) ABSTRACT

Provided by the present application are an electronic device, method and computer-readable storage medium used for wireless communication, the electronic device comprising: a processing circuit, configured to: obtain from a monitoring node in a management area a monitoring result of the monitoring node for a specified channel, wherein the specified channel is one or more channels on available spectrum resources, and the specified channel is one or more channels having the highest possibility of non-collaborative interference which is estimated on the basis of historical data of the node; and determine whether there is non-collaborative interference on the specified channel on the basis of the monitoring result.

8 Claims, 16 Drawing Sheets

(51) Int. Cl.
*H04B 17/373* (2015.01)
*H04W 16/10* (2009.01)

(56) References Cited

U.S. PATENT DOCUMENTS

| | | | | |
|---|---|---|---|---|
| 2006/0012822 | A1* | 1/2006 | Matsumoto | G06T 15/08 |
| | | | | 358/1.15 |
| 2008/0146155 | A1* | 6/2008 | Makhlouf | H04L 5/0062 |
| | | | | 455/63.1 |
| 2012/0207032 | A1 | 8/2012 | Chen et al. | |
| 2013/0322235 | A1* | 12/2013 | Khoryaev | H04W 36/20 |
| | | | | 370/229 |
| 2014/0141824 | A1 | 5/2014 | Kim et al. | |
| 2015/0230105 | A1* | 8/2015 | Negus | H04W 24/02 |
| | | | | 370/329 |
| 2018/0255551 | A1* | 9/2018 | Geraci | H04B 17/345 |
| 2020/0343922 | A1* | 10/2020 | Abdelmonem | H04B 1/7097 |

FOREIGN PATENT DOCUMENTS

| | | |
|---|---|---|
| CN | 102835139 A | 12/2012 |
| CN | 104105211 A | 10/2014 |
| CN | 107371165 A | 11/2017 |

* cited by examiner

| Probability of non-coordination interferences occurring | Score for a channel |
|---|---|
| Never occurred | 0 |
| 0-20% | 1 |
| 20%-40% | 2 |
| 40%-60% | 3 |
| 60%-80% | 4 |
| 80%-100% | 5 |

| channel CBSD | Ch1 | Ch2 | Ch3 | Ch4 | Ch5 | Ch6 | Ch7 | Ch8 | Ch9 | Ch10 |
|---|---|---|---|---|---|---|---|---|---|---|
| CBSD1 | 1 | 0 | 0 | 0 | 1 | 4 | 0 | 3 | 0 | 0 |
| CBSD2 | 1 | - | - | - | 1 | 4 | - | - | - | - |
| CBSD3 | 2 | - | - | - | 2 | 5 | - | - | - | - |
| CBSD4 | 1 | - | - | - | 1 | - | - | 3 | - | - |

| | Ch1 | Ch2 | Ch3 | Ch4 | Ch5 | Ch6 | Ch7 | Ch8 | Ch9 | Ch10 |
|---|---|---|---|---|---|---|---|---|---|---|
| CBSD1 | 1 | 0 | 0 | 0 | 1 | 4 | 0 | 3 | 0 | 0 |
| CBSD2 | 1 | - | - | - | 1 | 4 | - | - | - | - |
| CBSD3 | 2 | - | - | - | 2 | 5 | - | - | - | - |
| Predictive score | 1.3 | - | - | - | 1.3 | 4.3 | - | 1 | - | - |

| Scheme | No coordination | Scheme 1 | Scheme 2 | Scheme 3 |
|---|---|---|---|---|
| Accumulated interferences at a monitoring node (dBm) | -69.2 | -72.4 | -71 | -71 |

| CxG2 | CBSD 1 | CBSD 2 | CBSD 3 | CBSD 4 | CBSD 5 | CBSD 6 | CBSD 7 | CBSD 8 | CBSD 9 | CBSD10 |
|---|---|---|---|---|---|---|---|---|---|---|
| No coordination | 13 | 13 | 13 | 13 | 13 | 13 | 13 | 13 | 13 | 13 |
| Scheme 1 | 13 | 13 | 13 | 13 | 13 | 13 | 13 | OFF | OFF | OFF |
| Scheme 2 | 13 | 13 | 13 | 13 | 13 | 13 | 13 | 5.4 | 12.3 | 10.9 |
| Scheme 3 | 11.2 | 11.2 | 11.2 | 11.2 | 11.2 | 11.2 | 11.2 | 11.2 | 11.2 | 11.2 |

ELECTRONIC DEVICE, METHOD AND COMPUTER-READABLE STORAGE MEDIUM USED FOR WIRELESS COMMUNICATION

CROSS-REFERENCE TO RELATED APPLICATIONS

The present application is based on PCT filing PCT/CN2019/076931, filed Mar. 5, 2019, and claims priority to Chinese Patent Application No. 201810186035.7, filed Mar. 7, 2018 with the China National Intellectual Property Administration, each of which is incorporated herein by reference in its entirety.

FIELD

Embodiments of the present disclosure generally relate to the field of wireless communications, and in particular to a co-existence coordination technology for a spectrum access system, and more in particular to an electronic apparatus and a method for wireless communications, and a computer-readable storage medium.

BACKGROUND

With the development of wireless communication technology, users have increasingly high demands for services with high quality, high-speed and new features. Wireless communication operators and equipment manufacturers are required to continuously improve the system to meet the users' demands. Therefore, a large amount of spectrum resources is required to support the emerging new services and to meet a demand of high-speed communication. The spectrum resources may be quantized by parameters such as time, frequency, bandwidth, and allowable maximum emitting power.

At present, limited spectrum resources are already allocated to fixed operators and services, and new available spectrum is very rare or expensive. Under this circumstance, the concept of dynamic spectrum utilization is proposed. That is, spectrum resources allocated to certain services but not fully utilized are dynamically utilized. These spectrum resources such as 3.5 GHZ, 5 GHz, and millimeter wave bands are unlicensed frequency bands for wireless communication services such as LTE.

For example, the Federal Communications Commission (FCC) of United States announced that the Citizen Broadband Radio Service (CBRS) band is to be open to commercial users. The spectrum of the CBRS band ranges from 3550 MHz to 3700 MHz. The FCC proposed a three-layer spectrum access system framework, which includes an Incumbent access (IA) user, a Priority Access License (PAL) user, and a General Authorized Access (GAA) user. In this three-layer spectrum sharing framework, spectrum is managed by a Spectrum Access System (SAS) to coordinate spectrum access among an existing military radar, a satellite earth station, and various new commercial users. The CBRS Alliance are developing related standards or technical specifications.

In the SAS system, a group of Citizen Broadband Service Devices (CBSDs) may be managed by a Co-existence Manager (CxM) collectively. Since different CxMs are independent from each other, when secondary user equipment managed by different CxMs share one channel, harmful interferences, may be caused to a primary user or another secondary user (for example, an IA user, a PAL user or a GAA user) that shares the spectrum, that is, the issue of non-coordination interferences may occur.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

An electronic apparatus for wireless communications is provided according to an aspect of the present disclosure. The electronic apparatus includes processing circuitry. The processing circuitry is configured to: acquire, from a monitoring node within a management region, a monitoring result of the monitoring node with respect to a specified channel, where the specified channel is one or more channels on available spectrum resources, and the specified channel is one or more channels with the highest probability of there being non-coordination interferences which is estimated based on historical data of nodes; and judge, based on the monitoring result, whether there are the non-coordination interferences on the specified channel.

A method for wireless communications is provided according to another aspect of the present disclosure. The method includes: acquiring, from a monitoring node within a management region, a monitoring result of the monitoring node with respect to a specified channel, where the specified channel is one or more channels on available spectrum resources, and the specified channel is one or more channels with the highest probability of there being non-coordination interferences which is estimated based on historical data of nodes; and judging, based on the monitoring result, whether there are the non-coordination interferences on the specified channel.

An electronic apparatus for wireless communications is provided according to an aspect of the present disclosure. The electronic apparatus includes processing circuitry. The processing circuitry is configured to: acquire a processing request from a co-existence management device, the processing request including a feature of non-coordination interferences monitored by the co-existence management device; and process the non-coordination interferences in response to the processing request.

A method for wireless communications is provided according to another aspect of the present disclosure. The method includes: acquiring a processing request from a co-existence management device, the processing request including a feature of non-coordination interferences monitored by the co-existence management device; and processing the non-coordination interferences in response to the processing request.

An electronic apparatus for wireless communications is provided according to an aspect of the present disclosure. The electronic apparatus includes processing circuitry. The processing circuitry is configured to: perform, in response to a monitoring instruction from a management apparatus, non-coordination interferences detection on a channel included in the monitoring instruction; and provide a monitoring report to the management apparatus.

A method for wireless communications is provided according to another aspect of the present disclosure. The method includes: performing, in response to a monitoring instruction from a management apparatus, non-coordination interferences detection on a channel included in the monitoring instruction; and providing a monitoring report to the management apparatus.

According to other aspects of the present disclosure, there are further provided computer program codes and computer program products for implementing the methods for wireless communications above, and a computer readable storage medium having recorded thereon the computer program codes for implementing the methods for wireless communications described above.

With the electronic apparatus and the method according to the above aspects of the present disclosure, the occurrence of the non-coordination interferences can be quickly and efficiently detected, so as to ensure spectrum utilization quality and spectrum utilization efficiency.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

As described above, when secondary systems (secondary users) utilizing spectrum resources are managed by different management devices for spectrum management (for example, CxMs), non-coordination interferences may occur. Therefore, it is desirable to detect the non-coordination interferences quickly and efficiently so as to effectively ensure communication quality for each communication system.

Figure 1:
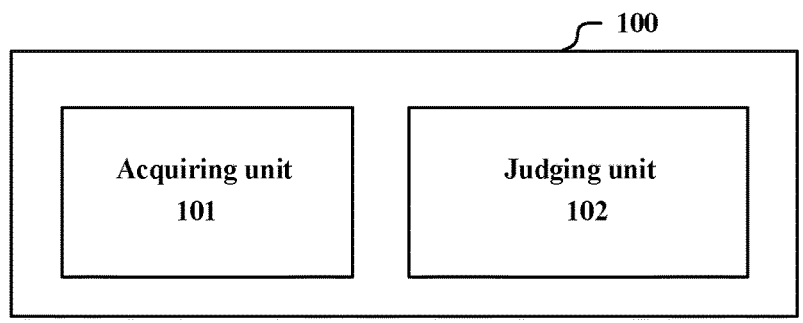
FIG. 1 is a block diagram showing functional modules of an electronic apparatus for wireless communications according to an embodiment of the present disclosure.

FIG. 1 is a block diagram showing functional modules of an electronic apparatus 100 for wireless communications according to an embodiment of the present disclosure. As shown in FIG. 1, the electronic apparatus 100 includes an acquiring unit 101 and a judging unit 102. The acquiring unit 101 is configured to acquire, from a monitoring node within a management region, a monitoring result of the monitoring node with respect to a specified channel. The specified channel is one or more channels on available spectrum resources, and is one or more channels with the highest probability of there being non-coordination interferences which is estimated based on historical data of nodes. The judging unit 102 is configured to judge, based on the monitoring result, whether there are the non-coordination interferences on the specified channel.

The acquiring unit 101 and the judging unit 102 may be implemented by one or more processing circuitries. The processing circuitry may be implemented as, for example, a chip. The electronic apparatus 100 may be, for example, located on a side of a spectrum management apparatus or communicably connected to the spectrum management apparatus. The spectrum management apparatus may be implemented as, for example, a Spectrum Access System (SAS), a Co-existence Manager (CxM), a geographic location database (GLDB), a Central Controller and Coordinator (C3) Instance or the like.

The management region is a region managed by the spectrum management apparatus in which the electronic apparatus 100 is located. There may be multiple users in the management region. A user described herein refers to, for example, a secondary system that utilizes spectrum resources allocated by the spectrum management apparatus to perform communication. The secondary system may include a base station and user equipment.

In addition, although not shown in FIG. 1, the electronic apparatus 100 further includes a communication interface via which the electronic apparatus 100 communicates with other spectrum management apparatus and/or users managed by the other spectrum management apparatus. The communication interface may be implemented by various wired or wireless communication interfaces.

In the present disclosure, the monitoring node refers to an apparatus having a radio monitoring capability, and may be a base station or user equipment in a secondary system. Spectrum resources which are available to users and which are managed by the spectrum management apparatus generally include multiple channels. In order to solve signaling overhead and measurement overhead, the monitoring node may monitor only a specified channel. The specified channel is one or more channels with the highest probability of there being non-coordination interferences among all channels. The probability is estimated based on historical data of nodes.

The historical data of a node includes, for example, historical records of channels ever utilized by the node, especially historical data related to non-coordination interferences. Through statistics on the historical data, a statistical probability of non-coordination interferences occurring on each channel can be accurately estimated, and a probability of non-coordination interferences occurring on each channel can be predicted, so that only particular channels are selected to be monitored.

In this way, by monitoring the specified channel(s) in a targeted manner, the non-coordination interferences can be quickly detected. Further, measurement and calculation resources as well as the signaling overhead can be saved.

Figure 2:
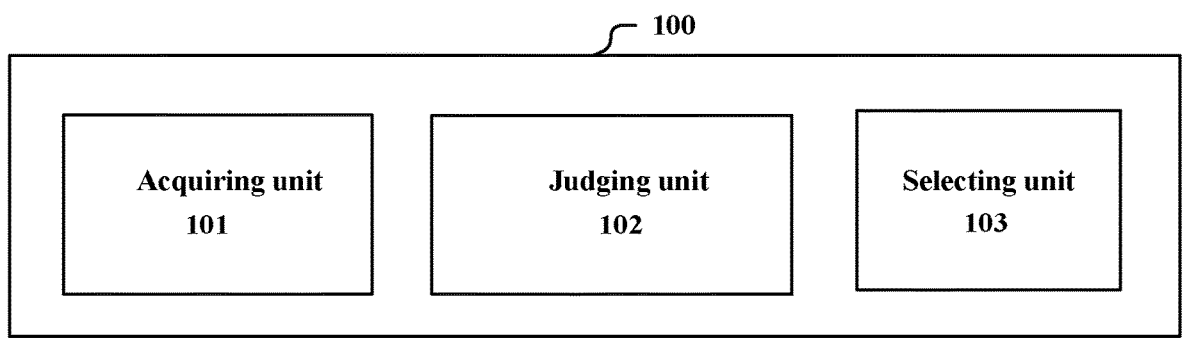
FIG. 2 is a block diagram showing functional modules of an electronic apparatus for wireless communications according to an embodiment of the present disclosure.

FIG. 2 is a block diagram showing functional modules of another example of the electronic apparatus 100. In addition to the units shown in FIG. 1, the electronic apparatus 100 further includes a selecting unit 103. The selecting unit 103 is configured to perform predictive scoring on each channel, based on historical utilization status by the monitoring node and at least a part of neighboring nodes of the monitoring node for the channel. For example, when a frequency of non-coordination interferences occurring on a certain channel is higher, the score of the channel is higher. The selecting unit 103 is further configured to select N channels with the highest score as the specified channel, where N may be a preset positive integer and/or the score of the selected channel exceeds a predetermined score threshold.

Similarly, the selecting unit 103 may be implemented by one or more processing circuitries. The processing circuitry may be implemented as, for example, a chip.

The neighboring nodes are nodes located within a monitoring range of the monitoring node. By performing predictive scoring based on historical utilization status for the channel by the neighboring nodes, accuracy of the scoring can be improved, thereby improving accuracy for detecting the non-coordination interferences, and better responding to a possible problem of a hidden node.

In an example, it is assumed that a sensing radius of the monitoring node is R, co-existence nodes within a sensing range of the monitoring node are selected as a candidate neighbor set, as expressed by the following equation (1):

$$\text{Candidate Neighbor Set}(s) = \{U_i | d(U_i, s) < R, i=1, 2, 3 \ldots N\} \quad (1)$$

where $d(U_i, s)$ represents a distance between an i-th co-existence node (for example, a CBSD) and a monitoring node s.

The selecting unit 103 is further configured to select a neighboring node in the candidate neighbor set, and perform the predictive scoring based on historical data of the selected neighboring node.

For example, the selecting unit 103 is configured to: acquire, based on historical utilization status for each channel, historical scores for each channel by the monitoring node and its respective neighboring nodes; calculate, based on the historical scores, score similarities between the monitoring node and respective neighboring nodes, and select neighboring nodes of which the score similarities meet a predetermined condition as the at least a part of the neighboring nodes; and perform predictive scoring on the channel according to the historical scores of the monitoring node and the selected neighboring nodes.

It is assumed that there are two co-existence nodes u and v, and score vectors of the two nodes for each channel are respectively represented by $r_u$ and $r_v$, and modules of the score vectors are represented by $\|r_u\|$ and $\|r_v\|$. A score similarity between the two nodes may be, for example, expressed as:

$$s(u, v) = \frac{r_u \cdot r_v}{\|r_u\| \cdot \|r_v\|} \quad (2)$$

It should be understood that equation (2) is a cosine distance formula for measuring a similarity, and is only an example. The similarity may be calculated in other manners, such as, by using Pearson correlation coefficient.

For example, the score similarity between the monitoring node and its neighboring node (that is, a node in the candidate neighbor set) is calculated by using the above equation (2), and nodes of which score similarities being within a set interval $[S_{low}, S_{high}]$ are selected as the neighboring nodes of the monitoring node. These selected nodes form a neighbor set, which is expressed as the following equation (3):

$$\text{Neighbor Set}(s) = \{U_i | S_{low} < s(U_i, s) < S_{high}, i \in \text{Candidate Neighbor Set}(s)\} \quad (3)$$

where $s(U_i, s)$ represents a score similarity between an i-th co-existence node and a monitoring node s, and the set interval of the similarity may be higher than a preset value or lower than a preset value.

Next, a predictive score for the channel can be calculated according to the historical scores of the monitoring node and the selected neighboring nodes. For example, the predictive score may be estimated by averaging the historical scores for each channel by the monitoring node and the selected neighboring nodes, as expressed by the following equation (4):

$$R(s, c) = \frac{\sum_{i=1}^{k} R_{ic}}{k}, \quad (4)$$

where k represents all nodes including the monitoring node s and the selected k-1 neighboring nodes, $R_{ic}$ represents a historical score for a channel c by each node, and R(s, c) represents a predictive score for the channel c by the monitoring node s.

Figures 3, 4:
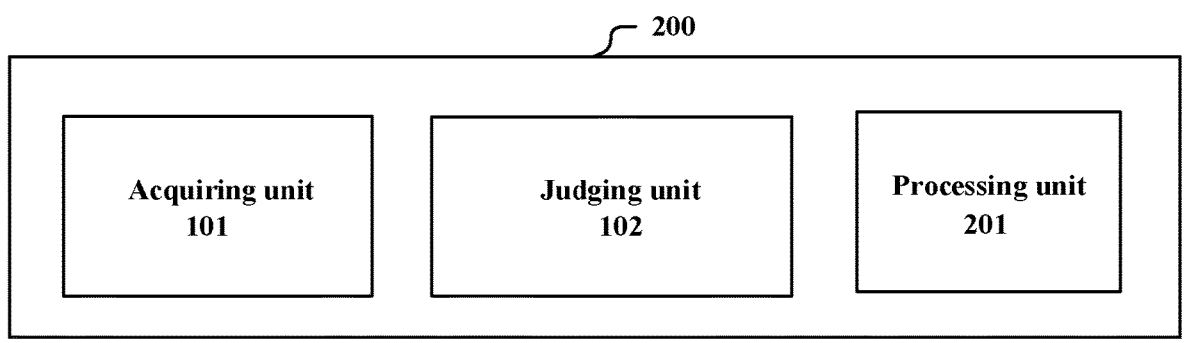
FIG. 3 shows an example of a channel score table.
FIG. 4 is a block diagram showing functional modules of an electronic apparatus for wireless communications according to another embodiment of the present disclosure.

The historical score for the channel may be acquired in various manners. FIG. 3 shows an example of a channel score table, where a value of the score ranges from 0 to 5. Scoring is performed according to a statistical probability of there being non-coordination interferences on this channel. It should be understood that this is only an example rather than limitation.

The historical scores for each channel by the monitoring node and the selected neighboring nodes are calculated. For example, the predictive score for this channel may be calculated by using the manner of equation (4).

Next, N channels with the highest score are selected as the specified channel to be monitored, where N may be a preset positive integer, or may be the number of channels acquired by selecting a score higher than a predetermined score threshold.

Specifically, the predictive scores for channels may be ranked. The predetermined score threshold may be set as needed. First several channels of which predictive scores exceed the threshold may be selected as the specified channels.

The monitoring node detects N specified channels one by one, and gets accumulated interference values detected on the N channels, respectively. The judging unit 102 judges whether there are non-coordination interferences on the specified channels by comparing the accumulated interference values with a predetermined interference tolerance.

It should be noted that the interference tolerance may be a dynamically variable interference threshold rather than a fixed value. The interference tolerance depends on, for example, an emitting spectrum template, a receiver sensitivity, and a requirement for out-of-band interference suppression of co-existence user equipment, as well as Quality of Service (QoS), such as a Signal to Interference and Noise Ratio (SINR) threshold of a co-existence user. Therefore, the interference tolerance may vary with change of a specific operation frequency, a spatial position of the co-existence user equipment, or a QoS threshold of the co-existence user.

In an example, the judging unit 102 may judge, based on an Interference to Noise Ratio (INR) of the monitored specified channel, whether there are non-coordination interferences on the specified channel. For example, the judging unit 102 may judge whether there are non-coordination interferences on the specified channel, by judging whether a difference between the monitored INR and a calculated INR in the case of no non-coordination interferences exceeds a predetermined threshold. If the difference between the monitored INR and the calculated INR exceeds the predetermined threshold, it is determined that there are non-coordination interferences on the specified channel. It should be understood that the difference is only an example, and other forms of parameters may be calculated. For example, a variance between the monitored INR and the calculated INR in the case of no non-coordination interferences may be calculated. It should be understood that INR is for each specified channel.

In addition, the judging unit 102 may judge whether there are non-coordination interferences on the specified channel, by comparing the monitored INR and an INR threshold set based on the historical data of the nodes. For example, a difference or variance between the monitored INR and the INR threshold set based on the historical data of the nodes may be calculated.

In addition, in an example, a neighboring node having a monitoring capability (that is, a wireless sensing capability) may also involve in detecting or measuring of the non-coordination interferences. A detection result is also provided to the judgment unit 102 for judgment, thereby further improving accuracy for detecting the non-coordination interferences.

In another example, in order to further reduce the system overhead, the selecting unit 103 may be further configured to select a node as the monitoring node based on one or more of the following parameters of the node in the management region: a position of the node, a monitoring capability of the node, and a load factor of the node. For example, the selecting unit 103 may select a monitoring node based on the load factor of the node. For example, the selecting unit 103 selects a node with a small load as the monitoring node. The selecting unit 103 may also select the monitoring node based on the monitoring capability of the node. For example, the selecting unit 103 selects a node having a monitoring capability or a node having a strong monitoring capability as the monitoring node.

For example, the selecting unit 103 may select a node that has a monitoring capability and a small load, and that is adjacent to a position prone to non-coordination interferences or adjacent to an important position, as the monitoring node.

The above positions may be collectively referred to as a critical position. That is, the critical position is a position in the management region at which the non-coordination interferences is to be monitored. The critical position includes, for example, one or more of the following positions: a position of a primary user, a position of a secondary user which is protected, and an overlapping region between different common channel groups. The overlapping region is position which is sensitive to the non-coordination interferences.

For example, the selecting unit 103 is configured to select the monitoring node based on effective distances between respective nodes and a critical position. The effective distance is obtained based on a physical distance between the node and the critical position and a load factor of the node. By selecting the monitoring node based on the effective distance, both the position of the node and the load of the node can be considered. For example, the selecting unit 103 may select a node with the smallest effective distance to each critical position as the monitoring node with respect to the critical position.

A specific example for selecting the monitoring node based on an effective distance matrix is given below. It is assumed that M critical positions are selected, and coordinates of a j-th critical position are expressed as $P_j=(X_j, Y_j)$, a critical position set formed by the M critical positions may be expressed as:

$$P=\{P_1,P_2,\ldots P_M\}=\{(X_1,Y_1),(X_2,Y_2)\ldots(X_M,Y_M)\} \quad (5)$$

If there are N nodes having the monitoring capability (for example, CBSD nodes) in the management region and position coordinates of an i-th node are expressed as $U_i=(x_i, y_i)$, a set of user nodes may be expressed by the following equation (6):

$$U=\{U_1,U_2\ldots U_N\}=\{(x_1,y_1),(x_2,y_2)\ldots(x_N,y_N)\} \quad (6)$$

An effective distance $d_{ij}^{(*)}$ between the i-th node and a j-th critical position is expressed as:

$$d_{ij}^{(*)} = \frac{d_{ij}}{1-\eta_i} \quad (7)$$

where $d_{ij}$ represents a physical distance between the i-th node and the j-th critical position, and $\eta_i (0 \leq \eta \leq 1)$ represents a load factor of the i-th node (for example, a CBSD apparatus based on LTE-TDD), where $d_{ij}$ is expressed by the following equation (8):

$$d_{ij}=(x_i-X_j)^2+(y_i-Y_j)^2 \quad (8)$$

The load factor of the i-th node may be expressed by the following equation (9):

$$\eta_i = \frac{L_c}{L_{max}} \quad (9)$$

where $L_c$ represents a current load of the i-th node, and $L_{max}$ represents a maximum load bearable by the node.

An effective distance matrix D may be calculated as follows:

$$D = \begin{bmatrix} d_{11}^{(*)} & d_{12}^{(*)} & \ldots & d_{1M}^{(*)} \\ d_{21}^{(*)} & d_{22}^{(*)} & \ldots & d_{2M}^{(*)} \\ \vdots & \vdots & \ddots & \vdots \\ d_{N1}^{(*)} & d_{N1}^{(*)} & \ldots & d_{NM}^{(*)} \end{bmatrix} \quad (10)$$

A vector in an i-th column of the effective distance matrix D represents an effective distance vector from the N nodes to an i-th critical position. For example, if a minimum value in the i-th column is $d_{ij}$, the j-th node is selected as the monitoring node. In this way, M nodes are selected from the N nodes as monitoring nodes, to form a monitoring node set.

In addition, if the load of the node itself is considered, in a case that a node is selected as a monitoring node for a critical position, the node is no longer considered when selecting monitoring nodes for other critical positions, so that one monitoring node is only utilized for monitoring one critical position.

It should be understood that in the case that a factor based on which the monitoring node is selected is related to the load of the node, since the load of the monitoring node varies with time, the monitoring node set is required to be dynamically updated. That is, in order to further optimize selection of the monitoring node, the selecting unit 103 may be configured to dynamically select the monitoring node based on a variation of loads of the nodes.

In an example, the selecting unit 103 is further configured to generate information indicating being selected as the monitoring node to be provided to the selected monitoring node. In this way, the selected monitoring node may perform monitoring operation. Optionally, the selecting unit 103 may be further configured to acquire a response from the monitoring node. The response indicates, for example, whether the monitoring node agrees to operate as a monitoring node.

In addition, the acquiring unit 101 is further configured to acquire a monitoring result from the monitoring node. The acquiring unit 101 may be configured to periodically acquire the monitoring result or acquire the monitoring result if a predetermined condition is met. For example, the monitoring node may make a preliminary judgment on the monitoring result, and report the monitoring result only in a case that the non-coordination interferences probably occur. The monitoring result may include an identification of the monitoring node and specific monitoring data. The specific monitoring data may include, for example, a measured INR, a timestamp, a channel index and the like.

Accordingly, a communication unit is configured to transmit the above information and receive the above response and the monitoring result.

The electronic apparatus 100 according to this embodiment can quickly and accurately detect the non-coordination interferences by selecting channels with high probability of non-coordination interferences occurring based on the historical data and instructing the monitoring node to monitor these channels. In addition, the electronic apparatus 100 selects a particular node as the monitoring node, thereby ensuring normal execution of the monitoring and validity of the monitoring result.

Second Embodiment

FIG. 4 is a block diagram showing functional modules of an electronic apparatus 200 for wireless communications according to another embodiment of the present disclosure. In addition to the acquiring unit 101 and the judging unit 102 shown in FIG. 1, the electronic apparatus 200 further includes a processing unit 201. The processing unit 201 is configured to extract a feature of the non-coordination interferences in the case of detecting the non-coordination interferences.

Similarly, the processing unit 201 may be implemented by one or more processing circuitries. The processing circuitry may be implemented as, for example, a chip.

The feature of the non-coordination interferences may include, for example, one or more of the following: an interference bandwidth, an interference-to-noise ratio (INR), a type of an interference signal, and a time when the non-coordination interferences occur.

For example, a time when the non-coordination interferences occur may be acquired based on a time-varying curve of the monitored INR. Since information (including a position, an apparatus type and the like) of each secondary user and a record that each secondary user utilizes the spectrum are recorded in the spectrum management apparatus, information of a secondary user producing the non-coordination interferences may be acquired by querying the record.

The processing unit 201 is further configured to perform processing on the non-coordination interferences based on the feature of the non-coordination interferences, so as to eliminate the non-coordination interferences.

In an example, the processing may include, for example, one or more operations of the following: adjusting spectrum or a beam for a user which is affected by the non-coordination interferences; requesting additional spectrum resources to the spectrum management apparatus. In this example, the user which is affected by the non-coordination interferences adjusts its spectrum utilization, that is, to avoid spectrum resources (for example, spectrum or beams) that have non-coordination interferences.

For example, the electronic apparatus 200 is located on a side of a CxM. When it is detected that there are non-coordination interferences on a channel, the processing unit 201 extracts a feature of the non-coordination interferences and acquires information of an affected secondary user. In the case of there being enough spectrum resources, a channel or a beam utilized by the secondary user is adjusted, to avoid the non-coordination interferences. In the case that a power emitting level of the secondary user is low, it is possible to try to increase the power emitting level of the secondary user. In addition, in the case of there being no idle spectrum resources, the processing unit 201 requests additional spectrum resources to an SAS. For example, in the case that a maximum number of interconnected vertices in an interference overlapping map is less than a maximum number of channels which can be provided by the SAS, that is, in the case of there being enough spectrum resources, the SAS allocates additional available spectrum resources to the CxM.

Figure 5:
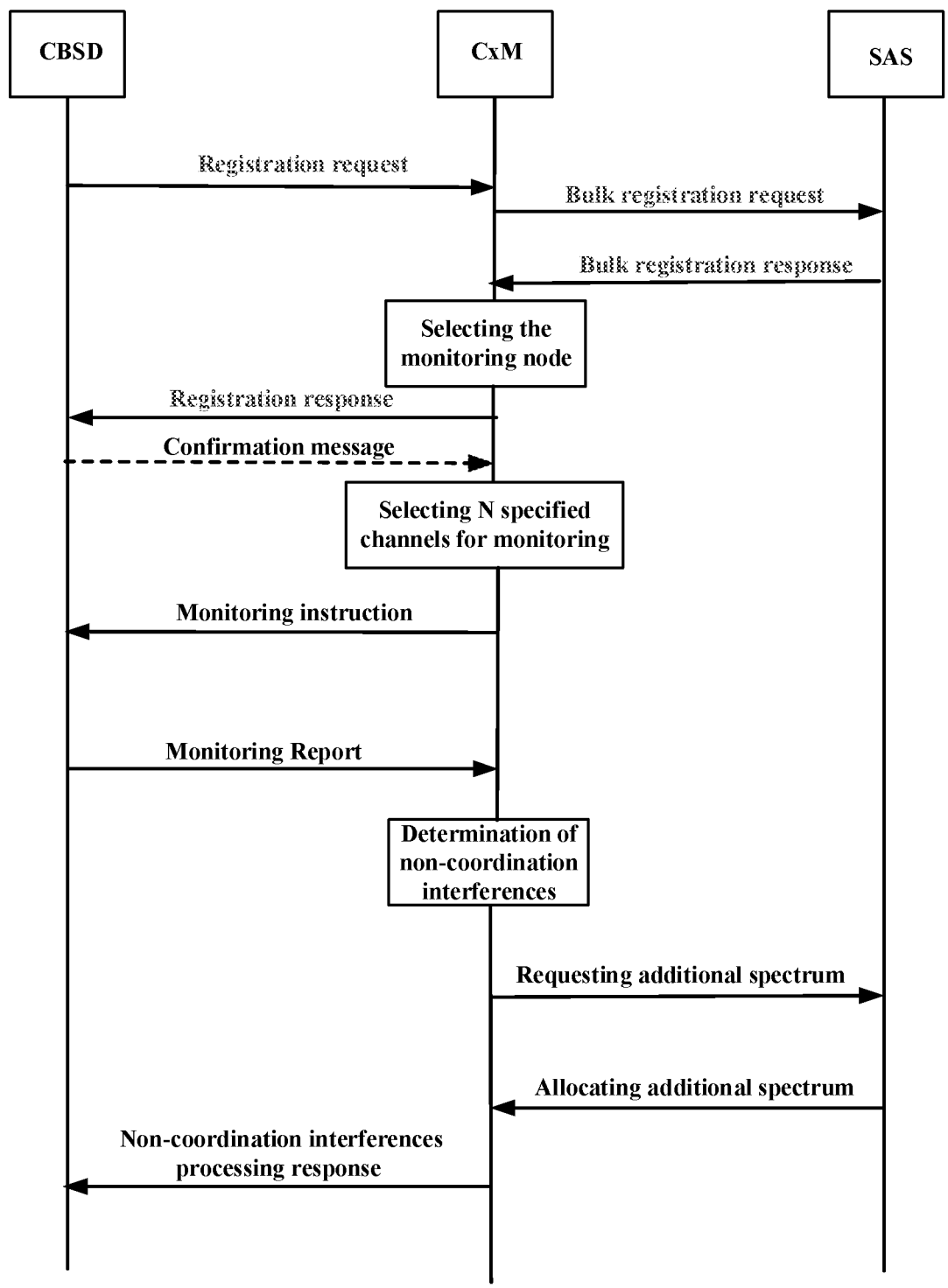
FIG. 5 is a schematic diagram showing an information procedure.

For ease of understanding, FIG. 5 is a schematic diagram showing an information procedure between a CxM including the electronic apparatus 200, a co-existence user equipment CBSD, and an SAS.

As shown in FIG. 5, the CBSD transmits a registration request to the CxM. The registration request may include information related to the CBSD such as position information, a requested frequency band, emitting power, and a monitoring capability. After receiving registration requests from multiple CBSDs, the CxM transmits a bulk registration request to the SAS. The SAS transmits a bulk registration response accordingly. In addition, the SAS calculates available spectrum resources to be allocated to the CBSDs based on the request. After acquiring the available spectrum resources, the CBSD transmits information on the available spectrum resources to the CxM. The available spectrum resources are managed by the CxM (not shown in FIG. 5).

As described in the first embodiment, the CxM selects particular nodes as monitoring nodes based on positions, monitoring capabilities, and load factors of respective nodes, and transmits a registration response to these monitoring nodes. As indicated by a dashed line in FIG. 5, optionally, the monitoring node may further transmit a response to the CxM to indicate a confirmation that the monitoring node agrees to operate as a monitoring node. Next, for each monitoring node, the CxM selects N specified channels with the highest probability of there being non-coordination interferences based on, for example, the historical data, and includes channel indexes of the N specified channels in a monitoring instruction and transmits the monitoring instruction to the monitoring node. The monitoring node transmits a monitoring report to the CxM after completing the monitoring. The monitoring report may include an identification and monitoring data of the monitoring node. The CxM judges whether there are non-coordination interferences based on the monitoring report, and performs processing on the non-coordination interferences in the case of there being non-coordination interferences.

FIG. 5 shows an example that the CxMs adjusts the spectrum utilization of a user affected by the non-coordination interferences. Specifically, the CxM may request additional spectrum to the SAS. In the case that spectrum of the SAS is enough, the SAS allocates additional available spectrum to the CxM, so that the CxM may allocate the additional available spectrum to the user affected by the non-coordination interferences. In addition, the CxM may avoid or mitigate the non-coordination interferences by adjusting a beam utilized by the user affected by the non-coordination interferences or increasing a power level of the user.

It should be understood that the above additional available spectrum allocated by the SAS may be available spectrum borrowed from another SAS in the same region. Specifically, in the case of there being different SASs in the same region, the SASs manage different frequency bands. Therefore, in the case that the spectrum of one SAS (which is referred to as a first SAS) is insufficient, the first SAS may temporarily borrow available spectrum from a second SAS among other SASs. When the second SAS also requires the spectrum, the first SAS instructs a secondary user that is utilizing the spectrum to stop utilizing the spectrum immediately, and returns the spectrum resources to the second SAS.

In another example, the electronic apparatus 200 is located on a side of the SAS. In the case of there being enough spectrum resources, the processing unit 201 allocates other available spectrum resources to the secondary user. In the case of insufficient spectrum resources, the SAS may borrow spectrum from another SAS (which is referred to as a peer SAS hereinafter) in the same region.

Figure 6:
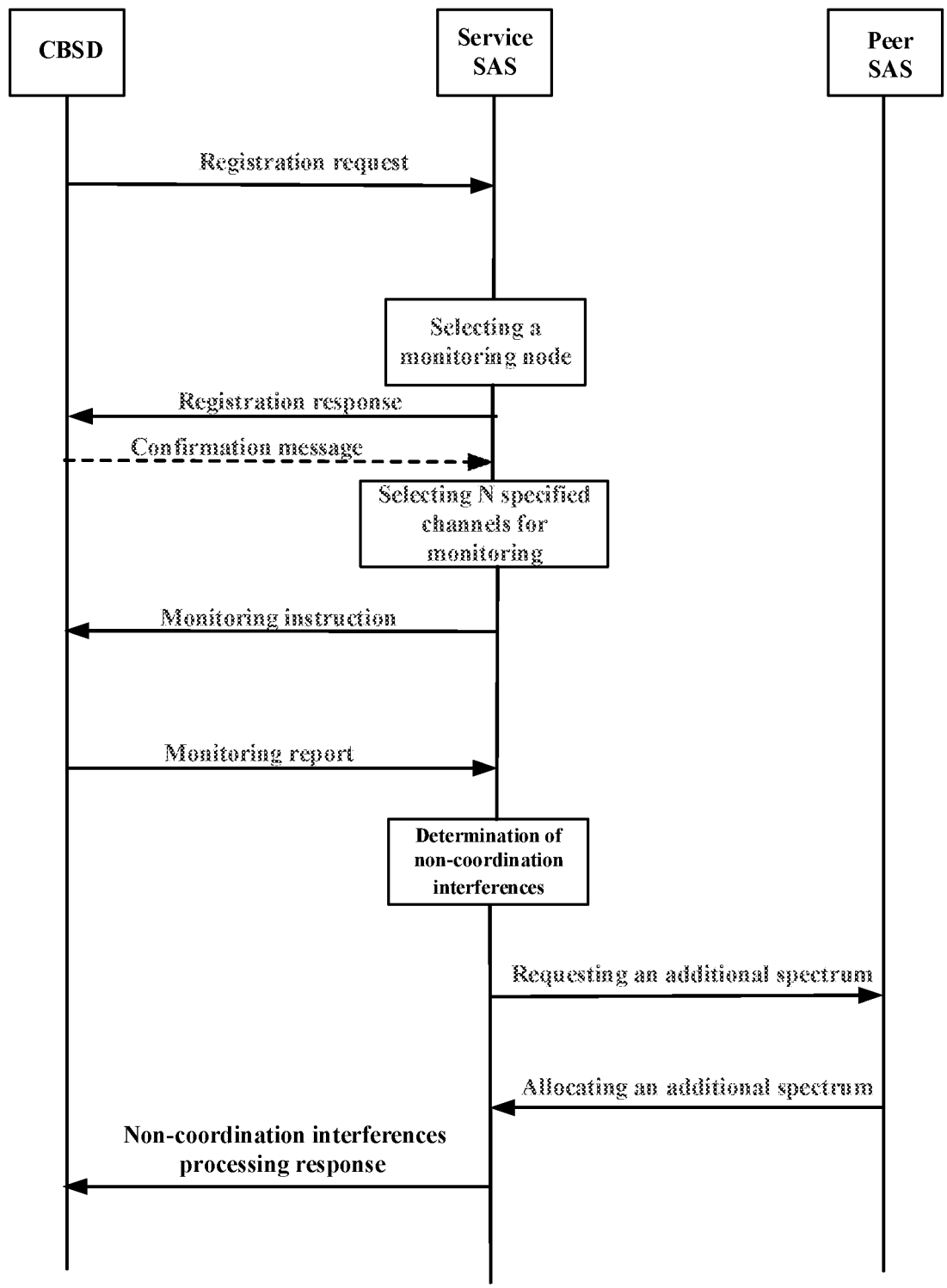
FIG. 6 is a schematic diagram showing another information procedure.

FIG. 6 is a schematic diagram showing an information procedure between a CBSD and a service SAS and between the service SAS and a peer SAS. As shown in FIG. 6, in this example, the SAS selects the monitoring node and determines the specified channel. Signaling interaction performed between the CBSD and the service SAS thereof is similar to that between the CBSD and the CxM shown in FIG. 5, and is not described here. A difference lies in that when the service SAS determines that there are non-coordination interferences and the SAS does not have enough spectrum resources, the service SAS borrows spectrum resources from the peer SAS and allocates the borrowed spectrum resources to a user affected by the non-coordination interferences. As non-coordination interferences processing response, similarly, the manner described above with reference to FIG. 5 that the non-coordination interferences are avoided or mitigated by adjusting a beam of the user affected by the non-coordination interferences or increasing a power level of the user may be utilized.

Alternatively, spectrum utilization of a user producing the non-coordination interferences may be adjusted. In this case, for example, the processing unit 201 may be configured to generate a processing request to be provided to the spectrum management apparatus, to request the spectrum management apparatus to perform the processing on the non-coordination interferences. The processing request includes the feature of the non-coordination interferences. The processing unit 201 is further configured to acquire, from the spectrum management apparatus, a processing result in response to the processing request. The processing result includes for example one or more of the following: additional spectrum resources are allocated to a secondary user producing the non-coordination interferences; spectrum or a beam for the secondary user producing the non-coordination interferences is adjusted; and a power emitting level for the secondary user producing the non-coordination interferences is adjusted.

In an example, the electronic apparatus 200 is located on a side of the CxM. When it is detected that there are non-coordination interferences on a channel, the processing unit 201 transmits the extracted feature of the non-coordination interferences to the SAS. After determining that the user producing the non-coordination interferences is a secondary user served by the present SAS or by another CxM managed by the SAS, the SAS adjusts a spectrum utilization behavior of the secondary user, for example, adjusts spectrum or a beam or a power emitting level for the secondary user. In the case of there being enough spectrum resources, the SAS may further allocate additional spectrum resources to the secondary user, or borrow available spectrum resources from another SAS for the secondary user.

Figure 7:
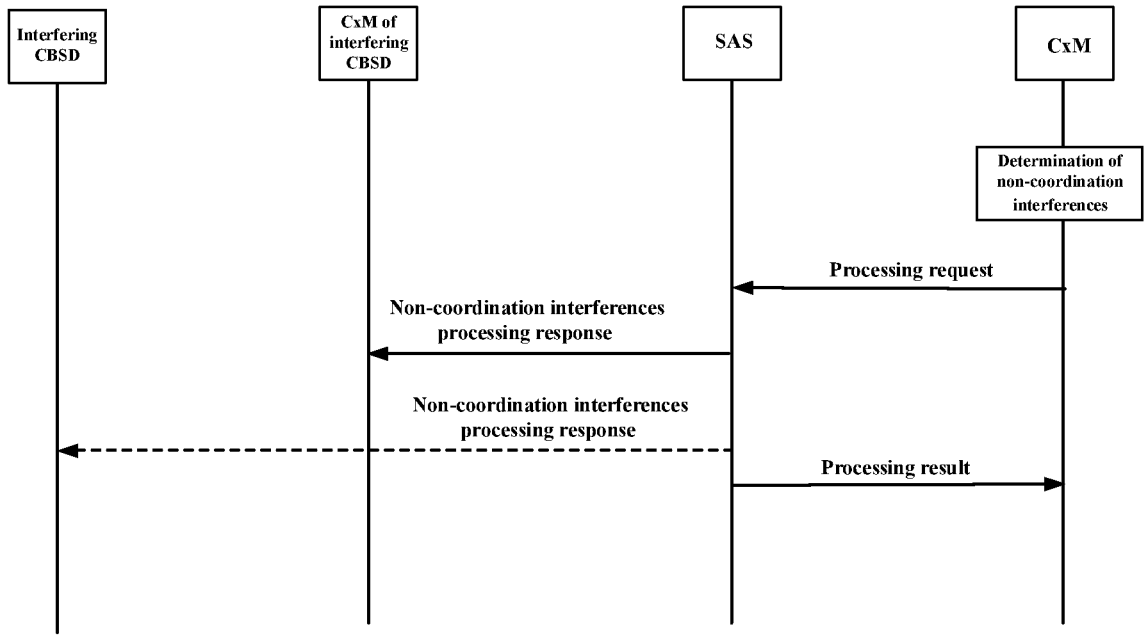
FIG. 7 is a schematic diagram showing another information procedure.

The information procedure before the determination of the non-coordination interferences shown in FIG. 5 is still applicable to this case. FIG. 7 is a schematic diagram showing an information procedure for determining and processing the non-coordination interferences. In FIG. 7, a CxM of a CBSD affected by the non-coordination interferences transmits a processing request to an SAS. If a CBSD that produces the non-coordination interferences (which is referred to as an interfering CBSD) is served by another CxM, the SAS adjusts a spectrum utilization behavior of the interfering CBSD via the CxM, for example, by allocating additional spectrum resources to the interfering CBSD, adjusting a beam of the interfering CBSD or reducing a power level of the interfering CBSD (that is, the non-coordination interferences processing response shown in FIG. 7). It should be understood that the additional available spectrum allocated by the SAS may be available spectrum borrowed by the SAS from another SAS in the same region. In addition, as indicated by a dashed line in FIG. 7, if the interfering CBSD is served by the SAS, the SAS adjusts the spectrum utilization behavior of the interfering CBSD. Subsequently, SAS may further transmit a processing result to the CxM of the CBSD that is affected by the non-coordination interferences.

Figure 8:
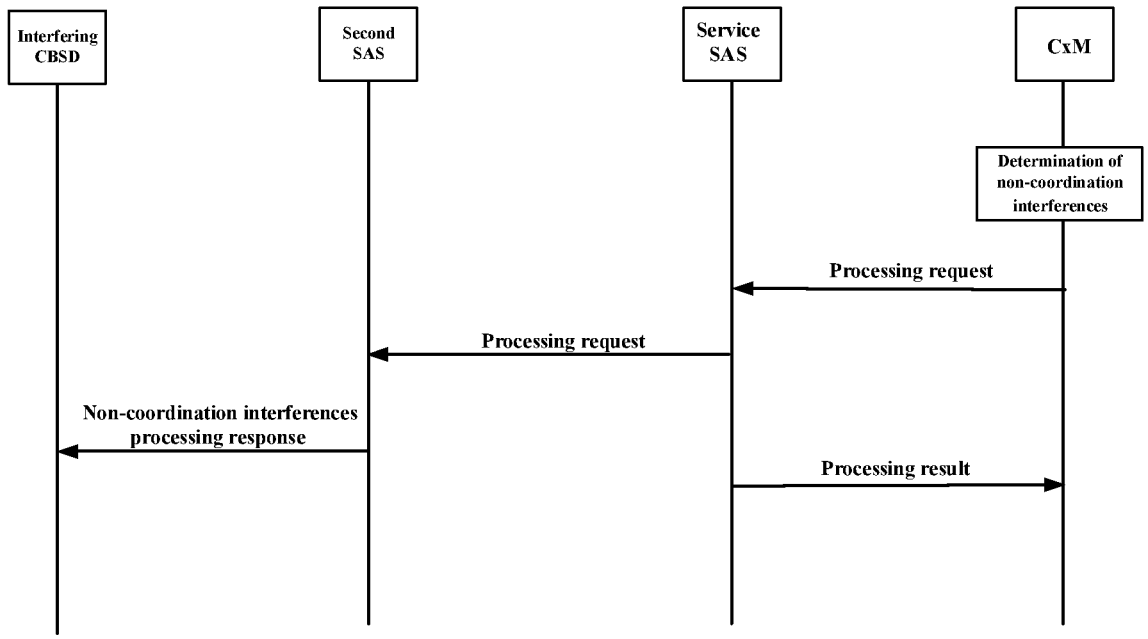
FIG. 8 is a schematic diagram showing another information procedure.

On the other hand, if a secondary user that produces the non-coordination interferences is served by another SAS (which is referred to as a second SAS), the CxM may transmit the above processing request to the second SAS via the SAS. The second SAS adjusts the spectrum utilization behavior of the secondary user that produces the non-coordination interferences, for example, by allocating additional spectrum resources to the secondary user, adjusting a beam for the secondary user, or reducing a power level for the secondary user. FIG. 8 is a schematic diagram showing an information procedure for determining and processing non-coordination interferences in this case. Although not shown in FIG. 8, the non-coordination interferences processing response of the second SAS to the interfering CBSD may be performed via the CxM. In addition, in the case that the second SAS does not have enough spectrum resources, the second SAS may also borrow spectrum from another SAS in the same region.

Figure 9:
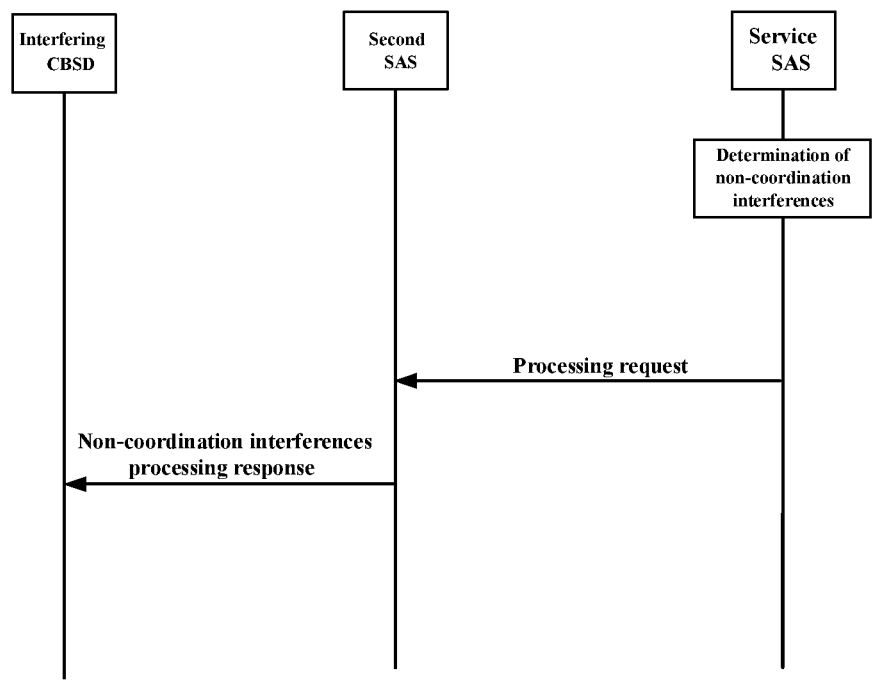
FIG. 9 is a schematic diagram showing another information procedure.

In another example, the electronic apparatus 200 is located on a side of the SAS. When the non-coordination interferences are detected, the processing unit 201 transmits a processing request to another SAS in the same region. A second SAS serving a secondary user that produces the non-coordination interferences adjusts a spectrum utilization behavior of the secondary user, for example, by allocating additional spectrum resources to the secondary user, adjusting a beam for the secondary user, or reducing a power level for the secondary user. FIG. 9 is a schematic diagram showing an information procedure for determining and processing non-coordination interferences in this case. Spectrum adjustment performed by the second SAS is similar to that shown in FIG. 8, and is not repeated herein.

The electronic apparatus 200 according to this embodiment can extract the feature of the non-coordination interferences, and then process the non-coordination interferences, thereby optimizing the performance of the spectrum access system and improving spectrum utilization efficiency.

Third Embodiment

Figure 10:
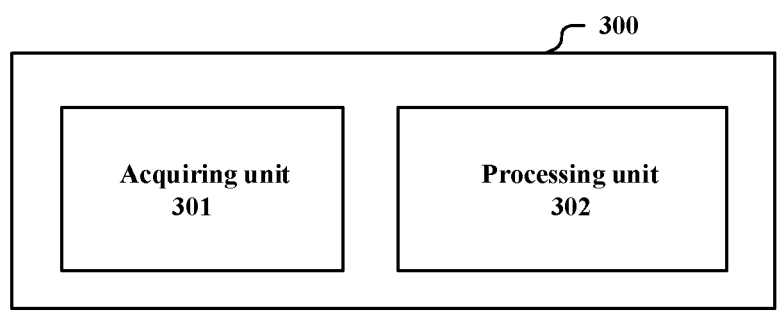
FIG. 10 is a block diagram showing functional modules of an electronic apparatus for wireless communications according to another embodiment of the present disclosure.

FIG. 10 is a block diagram showing functional modules of an electronic apparatus 300 for wireless communications according to another embodiment of the present disclosure. As shown in FIG. 10, the electronic apparatus 300 includes an acquiring unit 301 and a processing unit 302. The acquiring unit 301 is configured to acquire a processing request from a co-existence management device. The processing request includes a feature of non-coordination interferences monitored by the co-existence management device. The processing unit 302 is configured to process the non-coordination interferences in response to the processing request.

The acquiring unit 301 and the processing unit 302 may be implemented by one or more processing circuitries. The processing circuitry may be implemented as, for example, a chip. The electronic apparatus 300 may be, for example, located on a side of an SAS or communicably connected to an SAS.

In an example, the acquiring unit 301 is configured to determine, based on the feature of the non-coordination interferences, information of an interfering secondary user producing the non-coordination interferences. The processing unit 302 is configured to adjust with respect to the interfering secondary user to process the non-coordination interferences.

For example, the processing unit 302 may allocate additional spectrum resources to the interfering secondary user. The additional spectrum resources may be idle spectrum resources of a spectrum management apparatus where the electronic apparatus 300 is located, or spectrum resources borrowed by the spectrum management apparatus from another spectrum management apparatus.

In addition, the processing unit 302 may adjust spectrum or beam for the interfering secondary user so as to avoid the non-coordination interferences. Alternatively, the processing unit 302 may adjust a power emitting level for the interfering secondary user.

In another example, the processing unit 302 may dynamically set, based on a spectrum resource utilization status, a threshold related to spectrum utilization of a region involved in the non-coordination interferences, to process the non-coordination interferences.

For example, the threshold related to the spectrum utilization includes one or more of the following: a threshold for a ratio between a signal power and noise power, and a threshold for a ratio between an adjacent channel interfering power and noise power. The adjacent channel interfering power is power of an interference signal, out-of-band radiation or spurious radiation from another radio apparatus on a channel adjacent to a channel utilized by the user.

In an example, in the case that the number of available channels in a system is less than the number of channels required to avoid harmful interferences, that is, the spectrum resources are insufficient, the processing unit 302 may dynamically set a threshold related to spectrum utilization. For example, the processing unit 302 may reduce the threshold for the ratio between the signal power and noise power at a boundary of a coverage region of the base station in the involved region. In addition, in a case that the number of available channels in the system is greater than the number of channels required to avoid harmful interferences, that is, the spectrum resources are enough, the processing unit 302 may increase the threshold for the ratio between the signal power and noise power at the boundary of the coverage region of the base station in the involved region. In this way, a system capacity, quality of service (QoS) for users, and spectrum utilization rate can be all taken into account.

Although not shown in FIG. 10, the electronic apparatus 300 may further include a communication unit. The communication unit is configured to perform a communication function between the electronic apparatus 300 and another apparatus. For example, the acquiring unit 301 may receive the processing request via the communication unit. The processing unit 302 may provide the processing result to a related secondary user or a co-existence management unit via the communication unit.

The electronic apparatus 300 according to this embodiment can process the non-coordination interferences, so as to improve communication quality of each user and improve the spectrum utilization efficiency.

Fourth Embodiment

Figure 11:
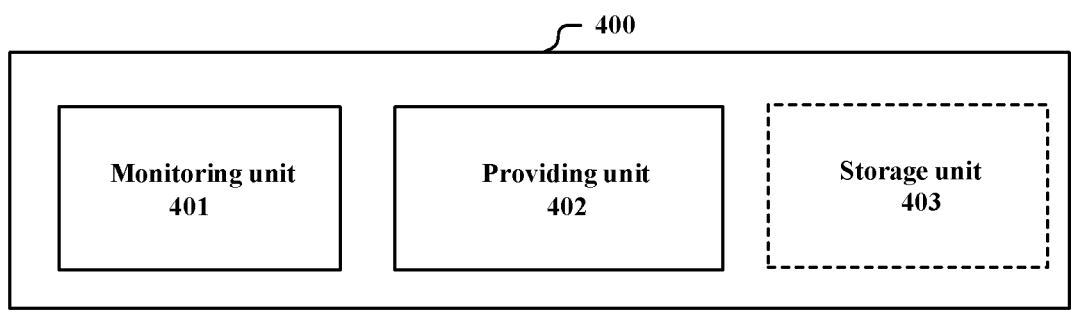
FIG. 11 is a block diagram showing functional modules of an electronic apparatus for wireless communications according to another embodiment of the present disclosure.

FIG. 11 is a block diagram showing functional modules of an electronic apparatus 400 for wireless communications according to another embodiment of the present disclosure. As shown in FIG. 11, the electronic apparatus 400 includes a monitoring unit 401 and a providing unit 402. The monitoring unit 401 is configured to perform, in response to a monitoring instruction from a management apparatus, non-coordination interferences detection on a channel included in the monitoring instruction. The providing unit 402 is configured to provide a monitoring report to the management apparatus.

The monitoring unit 401 and the providing unit 402 may be implemented by one or more processing circuitries. The processing circuitry may be implemented as, for example, a chip. The electronic apparatus 400 may be, for example, located on a side of a node or communicably connected to a side of a node, such as a side of a CBSD. Although not shown in FIG. 11, the electronic apparatus 400 may also include a communication unit for transmitting and receiving information.

The node where the electronic apparatus 400 is located may operate as a monitoring node for performing non-coordination interferences detection on a specified channel.

In an example, the monitoring unit 401 is further configured to acquire, from the management apparatus, a message of notifying a node where the electronic apparatus 400 is located of being selected as a monitoring node. The providing unit 402 is further configured to provide a response to the message to the management apparatus. This response is utilized to inform the management apparatus of whether the node agrees to operate as a monitoring node. The management apparatus may be, for example, a CxM or an SAS, or another spectrum management apparatus.

The providing unit 402 may provide the monitoring report to the management apparatus periodically or if a predetermined condition is met. A specific manner depends on setting of the management apparatus. The setting may be, for example, included in the monitoring instruction.

For example, the monitoring report may include one or more of the following: a measured interference-to-noise ratio, a timestamp, and a channel index. Based on the monitoring report, the management apparatus may determine and process the non-coordination interferences.

As shown by a dashed line block in FIG. 11, the electronic apparatus 400 may further include a storage unit 403. The storage unit 403 is configured to store historical data of the non-coordination interferences. The storage unit 403 may be, for example, implemented as various memories. The historical data may be a historical measurement result of the node, and may be provided to the management apparatus, so as to be used by the management apparatus in selecting a specified channel.

In an example, the providing unit 402 may be configured to perform scoring for each channel based on the historical data and provide the score to the management apparatus. When a frequency of non-coordination interferences occurring on a certain channel is higher, the score of the channel is higher. One can refer to, for example, the first embodiment for a specific scoring manner. In this example, the node processes the historical measurement result and provides only a scoring result to the management apparatus, thereby reducing signaling overhead.

The electronic apparatus 400 according to this embodiment can monitor a specified channel, so as to assist the management apparatus in determining and processing the non-coordination interferences.

Fifth Embodiment

In the process of describing the electronic apparatus for wireless communications in the embodiments described above, obviously, some processing and methods are also disclosed. Hereinafter, an overview of the methods is given without repeating some details disclosed above. However, it should be noted that, although the methods are disclosed in a process of describing the electronic apparatus for wireless communications, the methods do not certainly employ or are not certainly executed by the aforementioned components. For example, the embodiments of the electronic apparatus for wireless communications may be partially or completely implemented with hardware and/or firmware, the methods for wireless communications described below may be executed by a computer-executable program completely, although the hardware and/or firmware of the electronic apparatus for wireless communications can also be used in the methods.

Figure 12:
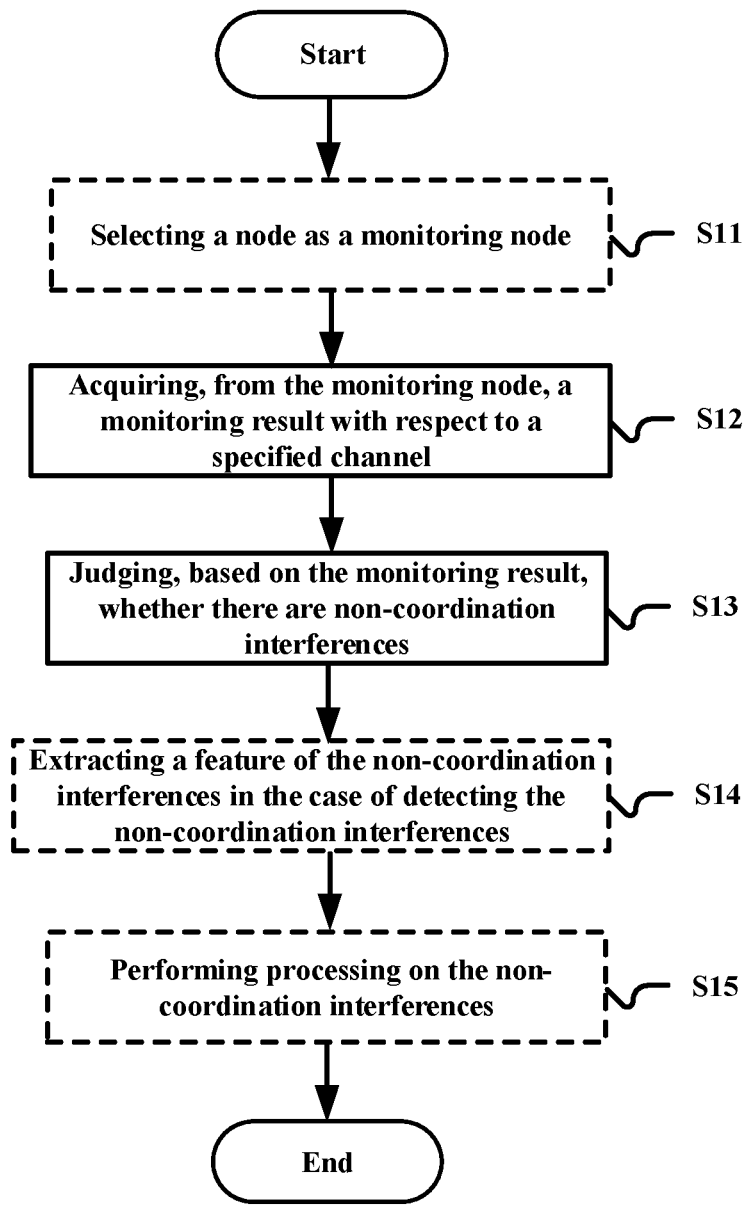
FIG. 12 is a flowchart of a method for wireless communications according to an embodiment of the present disclosure.

FIG. 12 is a flowchart of a method for wireless communications according to an embodiment of the present disclosure. The method includes: acquiring, from a monitoring node within a management region, a monitoring result of the monitoring node with respect to a specified channel (S12), where the specified channel is one or more channels on available spectrum resources, and the specified channel is one or more channels with the highest probability of there being non-coordination interferences which is estimated based on historical data of nodes; and judging, based on the monitoring result, whether there are the non-coordination interferences on the specified channel (S13). The method may be performed, for example, on a side of a spectrum management apparatus.

In an example, in step S12, the specified channel is selected as follows: performing predictive scoring on each channel, based on historical utilization status by the monitoring node and at least a part of neighboring nodes of the monitoring node for the channel, where when a frequency of non-coordination interferences occurring on a certain channel is higher, the score of the channel is higher; and selecting N channels with the highest predictive score as the specified channel, where N may be a preset positive integer and/or the predictive score of the selected channels exceeds a predetermined score threshold.

For example, the predictive scoring on the channel may be performed as follows. Based on historical utilization status for each channel, historical scores for each channel by the monitoring node and its respective neighboring nodes are acquired. Based on the historical scores, score similarities between the monitoring node and respective neighboring nodes are calculated, and neighboring nodes of which the score similarities meet a predetermined condition are selected as the at least a part of the neighboring nodes. Predictive scoring is performed on the channel according to the historical scores of the monitoring node and the selected neighboring nodes. For example, the predictive score may be estimated by averaging the historical scores for respective channels by the monitoring node and the at least a part of the neighboring nodes. The neighboring nodes are nodes located within a monitoring range of the monitoring node.

In step S13, whether there are non-coordination interferences on the specified channel may be judged by comparing the accumulated interference values detected on the specified channel and a predetermined interference tolerance. For example, whether there are non-coordination interferences may be judged based on an interference-to-noise ratio (INR) of the monitored specified channel. Specifically, whether there are non-coordination interferences on the specified channel may be judged by judging whether a difference between the monitored INR and a calculated INR in the case of no non-coordination interferences exceeds a predetermined threshold. Alternatively, whether there are non-coordination interferences on the specified channel may be judged by comparing the monitored INR and an INR threshold set based on the historical data of the nodes.

In addition, as shown by a dashed line block in FIG. 12, the above method may further include a step S11 of selecting a node as the monitoring node based on one or more of the following parameters of the node in the management region: a position of the node, a monitoring capability of the node, and a load factor of the node.

Step S11 may further include generating information indicating being selected as the monitoring node to be provided to the selected monitoring node and acquiring a response from the monitoring node. Step S12 further includes acquiring a monitoring result from the monitoring node.

For example, in step S11, the monitoring node may be selected based on effective distances between respective nodes and a critical position. The critical position is a position in the management region at which the non-coordination interferences are to be monitored. The effective distance is obtained based on a physical distance between the node and the critical position and a load factor of the node. A node with the smallest effective distance to each critical position may be selected as the monitoring node with respect to the critical position. The critical position may include one or more of the following positions: a position of a primary user, a position of a secondary user which is protected, and an overlapping region between different common channel groups. The load factor of the node may be, for example, a ratio between a current load of the node and a maximum load bearable by the node. Step S11 may be dynamically performed depending on a variation of loads of the nodes.

As shown by another dashed line block in FIG. 12, the above method may further include a step S14 of extracting a feature of the non-coordination interferences in the case of detecting the non-coordination interferences. For example, the feature of the non-coordination interferences includes one or more of the following: an interference bandwidth, an interference-to-noise ratio (INR), a type of an interference signal, and a time when the non-coordination interferences occur.

As shown by another dashed line block in FIG. 12, the above method may further include a step S15 of performing processing on the non-coordination interferences based on the feature of the non-coordination interferences. For example, the processing may include one or more operations of the following: adjusting spectrum, a beam or a power emitting level for a user which is affected by the non-coordination interferences; and requesting additional spectrum resources to the spectrum management apparatus. Alternatively, the processing may further include: generating a processing request to be provided to the spectrum management apparatus, to request the spectrum management apparatus to perform the processing on the non-coordination interferences, where the processing request includes the feature of the non-coordination interferences; and acquiring, from the spectrum management apparatus, a processing result in response to the processing request. The processing result may include one or more of the following: additional spectrum resources are allocated to a secondary user producing the non-coordination interferences; spectrum or a beam for the secondary user producing the non-coordination interferences is adjusted; and a power emitting level for the secondary user producing the non-coordination interferences is adjusted.

Figure 13:
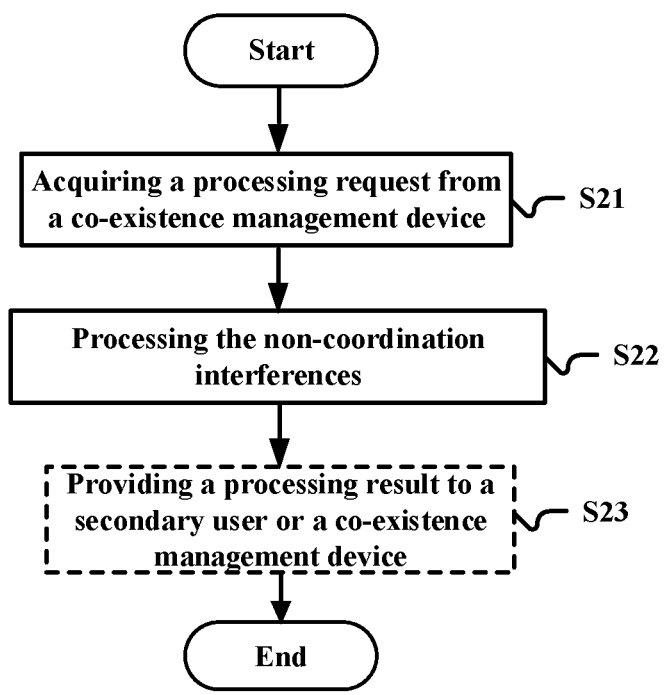
FIG. 13 is a flowchart of a method for wireless communications according to another embodiment of the present disclosure.

FIG. 13 is a flowchart of a method for wireless communications according to another embodiment of the present disclosure. The method includes: acquiring a processing request from a co-existence management device, the processing request including a feature of non-coordination interferences monitored by the co-existence management device (S21); and processing the non-coordination interferences in response to the processing request (S22). This method may be performed, for example, on a side of a spectrum management apparatus.

In an example, in step S22, information of an interfering secondary user producing the non-coordination interferences is determined based on the feature of the non-coordination interferences, and adjustment is performed with respect to the interfering secondary user to process the non-coordination interferences. For example, additional spectrum resources may be allocated to the interfering secondary user. The additional spectrum resources are idle spectrum resources of a spectrum management apparatus where the electronic apparatus is located, or spectrum resources borrowed by the spectrum management apparatus from another spectrum management apparatus. Alternatively, spectrum or a beam for the interfering secondary user may be adjusted, or a power emitting level for the interfering secondary user may be adjusted.

In step S22, a threshold related to spectrum utilization of a region involved in the non-coordination interferences may be dynamically set, to process the non-coordination interferences. For example, the threshold related to the spectrum utilization includes one or more of the following: a threshold for a ratio between a signal power and noise power, and a threshold for a ratio between an adjacent channel interfering power and noise power.

As shown by a dashed line block in FIG. 13, the above method may further include a step S23 of providing the processing result to the related secondary user or the co-existence management device.

Figure 14:
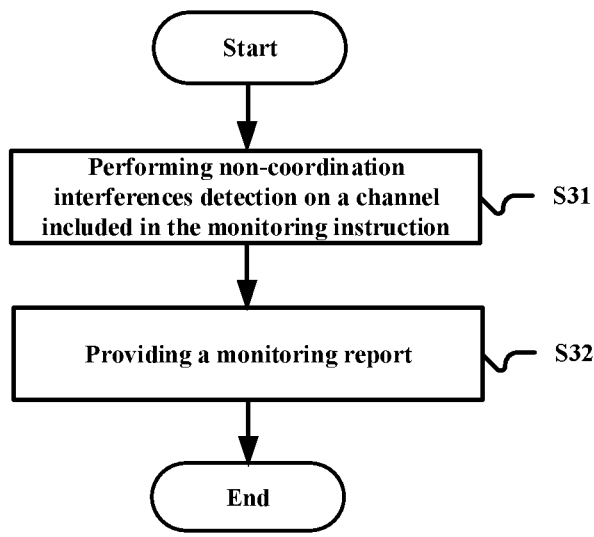
FIG. 14 is a flowchart of a method for wireless communications according to another embodiment of the present disclosure.

FIG. 14 is a flowchart of a method for wireless communications according to another embodiment of the present disclosure. The method includes: performing, in response to a monitoring instruction from a management apparatus, non-coordination interferences detection on a channel included in the monitoring instruction (S31); and providing a monitoring report to the management apparatus (S32). This method may be performed, for example, on a side of the node, that is, on an apparatus side of the secondary user.

In addition, although not shown in FIG. 14, before step S31, the above method may further include: acquiring, from the management apparatus, a message of notifying a node where the electronic apparatus is located of being selected as a monitoring node, and providing a response to the message to the management apparatus. After step S32, the method may further include: storing historical data of the non-coordination interferences.

For example, the monitoring report may include one or more of the following: a measured interference-to-noise ratio, a timestamp, and a channel index.

The above method may further include: performing scoring for each channel based on the historical data and providing the score to the management apparatus. When a frequency of non-coordination interferences occurring on a certain channel is higher, the score of the channel is higher.

It should be noted that above methods may be utilized in combination or separately. Details of the above methods are described in the first to fourth embodiments, and are not described here.

In the following, in order to better understand the technology according to the present disclosure, two system simulation examples are given. It should be understood that these simulation examples are illustrative only rather than restrictive.

Figures 15, 16, 17:
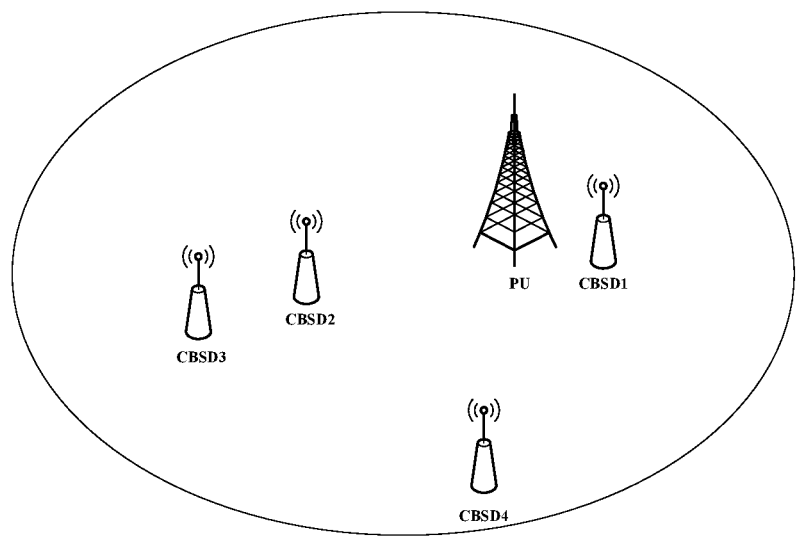
FIG. 15 shows a schematic diagram of a first system scenario for simulation.
FIG. 16 shows an example of a channel score table in simulation.
FIG. 17 shows another example of a channel score table in simulation.

FIG. 15 shows a schematic diagram of a first system scenario for simulation, in which PU represents a primary user. It is assumed that there are four co-existence secondary users, namely, CBSD1 to CBSD4. Channels allocated by CxM for the four co-existence secondary users are represented by Ch1 to Ch4, respectively. The CBSD1 having the smallest effective distance to the protected primary user PU is selected as the monitoring node. CBSD2, CBSD3, and CBSD4 are co-existence secondary users. A channel score table is shown in FIG. 16. The channel score table is obtained, for example, in the manner described in the first embodiment with reference to FIG. 3.

According to the channel score table (where an item having no score is regarded to be scored 0), similarities between the monitoring node and respective user nodes may be calculated as: $S(1,2)=0.82$, $S(1,3)=0.81$, and $S(1,4)=0.64$.

It is assumed that a threshold for selecting a neighboring node is $S_0=0.8$. Nodes CBSD2 and CBSD3 are selected as neighboring nodes for the monitoring node CBSD1. Since a similarity between the node CBSD4 and the monitoring node CBSD1 is less than the threshold, the node CBSD4 is not selected as a neighboring node.

It should be noted that in an initial state where there is no historical data, the monitoring node senses whether there are non-coordination interferences on the channel. Channels are sensed in a polling manner, that is, all channels are sensed. Upon elapse of a time period, each monitoring node starts to operate, to generate a historical score for each channel. The monitoring node obtains a predictive score for each channel at a current time instant according to the historical scores of the monitoring node and its neighboring nodes. FIG. 17 shows an example of predictive scores.

Predictive scores are expressed as follows: $R(Ch6)=4.3$, $R(Ch1)=1.3$, $R(Ch5)=1.3$, and $R(Ch8)=1$. The predictive scores are ranked in a descending order, that is, $R(Ch6)>R(Ch1)=R(Ch5)>R(Ch8)$. Therefore, the monitoring node first detects a channel 6, then detects channels 1 and 5, and finally detects a channel 8, to judge whether there are non-coordination interferences.

It is assumed that the monitoring node requires 10 ms for detecting one channel, 60 ms is required to detect the channel (Ch6) with non-coordination interferences by utilizing the conventional channel sensing algorithm, and only 10 ms is required to detect whether there are non-coordination interferences by utilizing the provided channel recommendation algorithm. Therefore, a delay caused by detection is significantly reduced, and the accuracy for detecting the non-coordination interferences is improved.

Figures 18, 19:
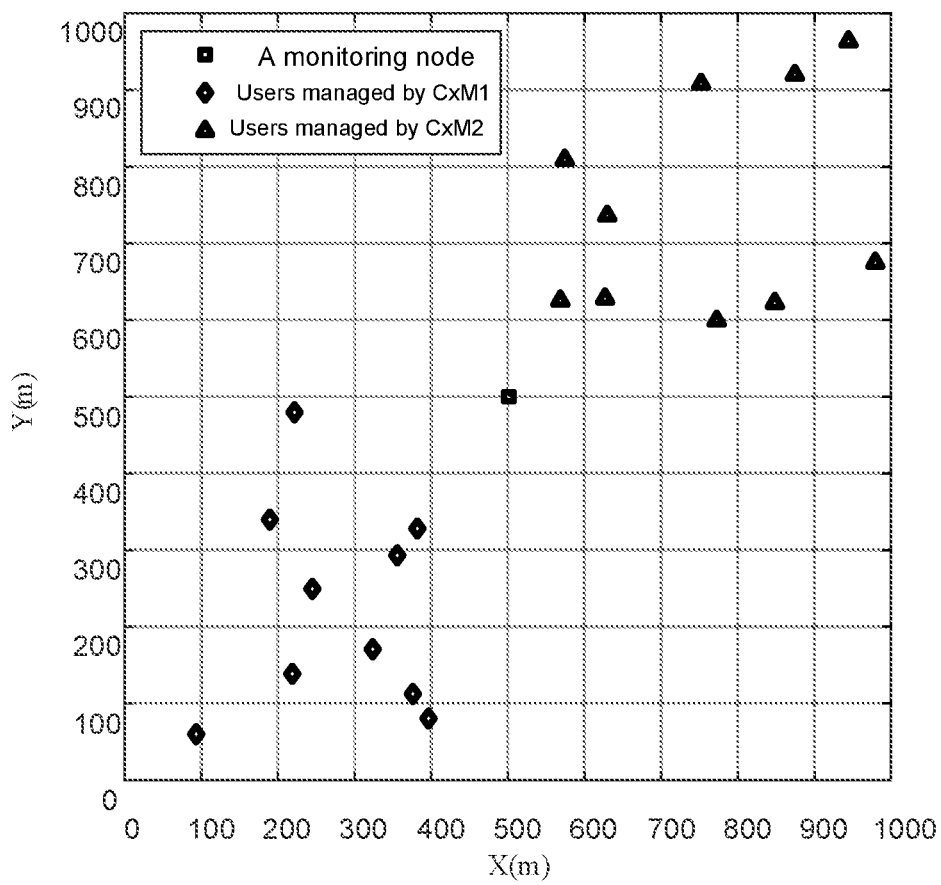
FIG. 18 shows a schematic diagram of a second system scenario for simulation.
FIG. 19 shows a comparison between accumulated interferences at a monitoring node in different conditions.

FIG. 18 shows a schematic diagram of a second system scenario for simulation. In a 1000 m×1000 m simulation region, it is assumed that there are two co-existence management groups CxG1 and CxG2, each of which has 10 CBSD secondary users (SU). It is assumed that the secondary users of the two co-existence groups CxG1 and CxG2 are randomly and uniformly distributed in two 500 m×500 m regions. In order to ensure performance of the secondary users, a secondary user located at a position (500,500) on a boundary of the two co-existence groups is selected as the monitoring node.

Simulation parameters utilized in the simulation are as follows: an operation frequency of 3.6 GHz, a channel bandwidth of 20 MHz, a default emitting power of 13 dBm for a CBSD, a noise figure (NF) of 10 dB at the CBSD, and an interference margin of 20 dB at the CBSD.

It is assumed that an interference threshold for the CBSD secondary users is −71 dBm, and accumulated interferences generated by secondary users of the CxG1 on the monitoring node is lower than the interference threshold. Whether there are non-coordination interferences exceeding the interference threshold may be judged by simulating accumulated interferences received by the monitoring node from the newly accessed secondary users of the CxG2 (that is, CBSDs managed by the CxG2).

FIG. 19 shows a comparison between accumulated interferences before co-existence coordination and accumulated interferences received by the monitoring node after three different coordination schemes are utilized to eliminate non-coordination interferences. As can be seen from the comparison, harmful interferences to the co-existence secondary users (that is, the secondary users of the CxG1) can be effectively avoided by utilizing the coordination schemes.

Figures 20, 21:
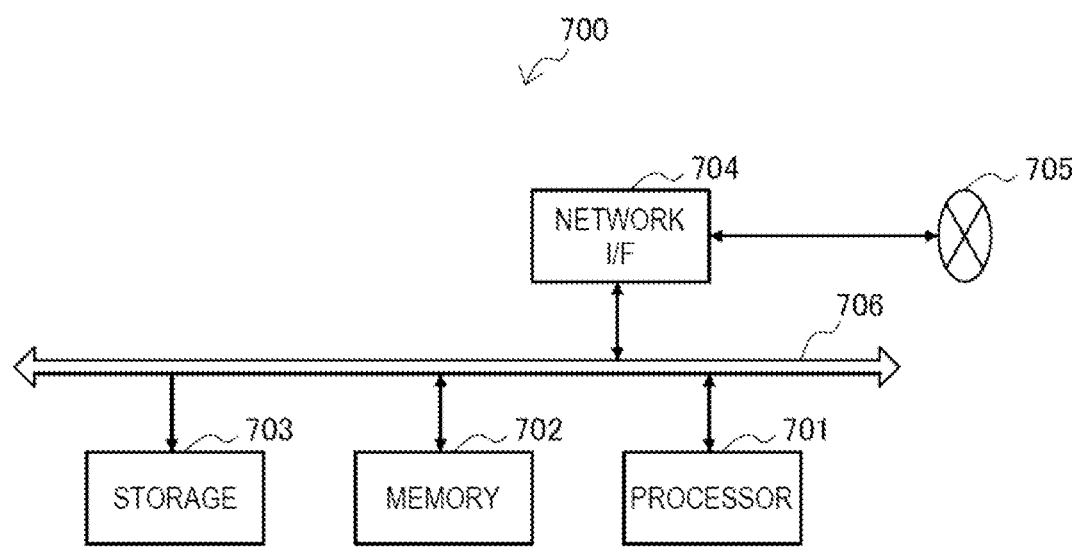
FIG. 20 shows a comparison between emitting power of CBSDs before co-existence coordination and emitting power of the CBSDs after utilizing three different coordination schemes.
FIG. 21 is a block diagram showing an exemplary configuration of a server 700 to which technology according to the present disclosure may be applied.

FIG. 20 shows a comparison between emitting power of CBSDs before co-existence coordination and emitting power of the CBSDs after utilizing three different coordination schemes. In the first scheme, a CBSD of the CxG2 that exceeds the interference tolerance is not allowed to access (that is, three CBSDs whose emitting powers are set to "OFF" shown in FIG. 20 immediately terminate emitting), so that accumulated interferences after coordination is less than or equal to the threshold. In the second scheme and the third scheme, interferences are suppressed by adjusting emitting power of the secondary users, so that the accumulated interferences generated by CBSDs of the CxG2 do not exceed the interference threshold. The first scheme is simple and easy to implement. Fairness among the secondary users is considered in the second scheme and the third scheme. In the second scheme, only an emitting power level of a later accessed secondary user is adjusted, and a secondary user who accesses the spectrum earlier is advantageous. In the third scheme, emitting power levels of all secondary users are lowered, so as to attempt to keep fairness among all co-existence secondary users.

The technology according to the present disclosure is applicable to various products. For example, the electronic apparatus 100, 200 or 300 may be implemented as any type of server, such as a tower server, a rack server, and a blade server. The electronic apparatus 100, 200 or 300 may be a control module (such as an integrated circuitry module including a single die, and a card or blade inserted into a slot of a blade server) mounted on a server.

In addition, the electronic apparatus 400 may be implemented as various base stations or user equipment. A base station may be implemented as any type of evolved Node B (eNB) or gNB (5G base station). The eNB includes, for example, a macro eNB and a small eNB. The small eNB may be an eNB covering a cell smaller than a macro cell, such as a pico eNB, a micro eNB, and a home (femto) eNB. The case for the gNB is similar to the above. Alternatively, the base station may be implemented as any other type of base station, such as a NodeB and a base transceiver station (BTS). The base station may include a main body (that is also referred to as a base station apparatus) configured to control radio communication, and one or more remote radio heads (RRH) disposed in a different place from the main body. In addition, various types of user equipments may each operate as the base station by temporarily or semi-persistently executing a base station function.

The user equipment may be implemented as a mobile terminal (such as a smartphone, a tablet personal computer (PC), a notebook PC, a portable game terminal, a portable/dongle-type mobile router, and a digital camera device) or an in-vehicle terminal such as a car navigation apparatus. The user equipment may also be implemented as a terminal (also referred to as a machine type communication (MTC) terminal) that performs machine-to-machine (M2M) communication. In addition, the user equipment may be a wireless communication module (such as an integrated circuit module including a single chip) mounted on each of the terminals described above.

[Application Example Regarding a Server]

FIG. 21 is a block diagram showing an example of a schematic configuration of a server 700 to which the technology of the present disclosure may be applied. The server 700 includes a processor 701, a memory 702, a storage 703, a network interface (I/F) 704, and a bus 706.

The processor 701 may be for example a central processing unit (CPU) or a digital signal processor (DSP), and control functions of the server 700. The memory 702 includes a random access memory (RAM) and a read-only memory (ROM), and stores a program that is executed by the processor 701, and data. The storage 703 may include a memory medium, such as a semiconductor memory and a hard disc.

The network interface 704 is a communication interface for connecting the server 700 to a communication network 705. The communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high-speed bus and a low-speed bus), each of which has different speed.

In the server 700 shown in FIG. 21, the acquiring unit 101 and the judging unit 102 described with reference to FIG. 1, the selecting unit 103 described with reference to FIG. 2, the processing unit 201 described with reference to FIG. 4, and the acquiring unit 301 and the processing unit 302 described with reference to FIG. 10 may be implemented by the processor 701. For example, the processor 701 may determine and process the non-coordination interferences on a specified channel by performing functions of these units.

[Application Example Regarding Base Station]

First Application Example

Figure 22:
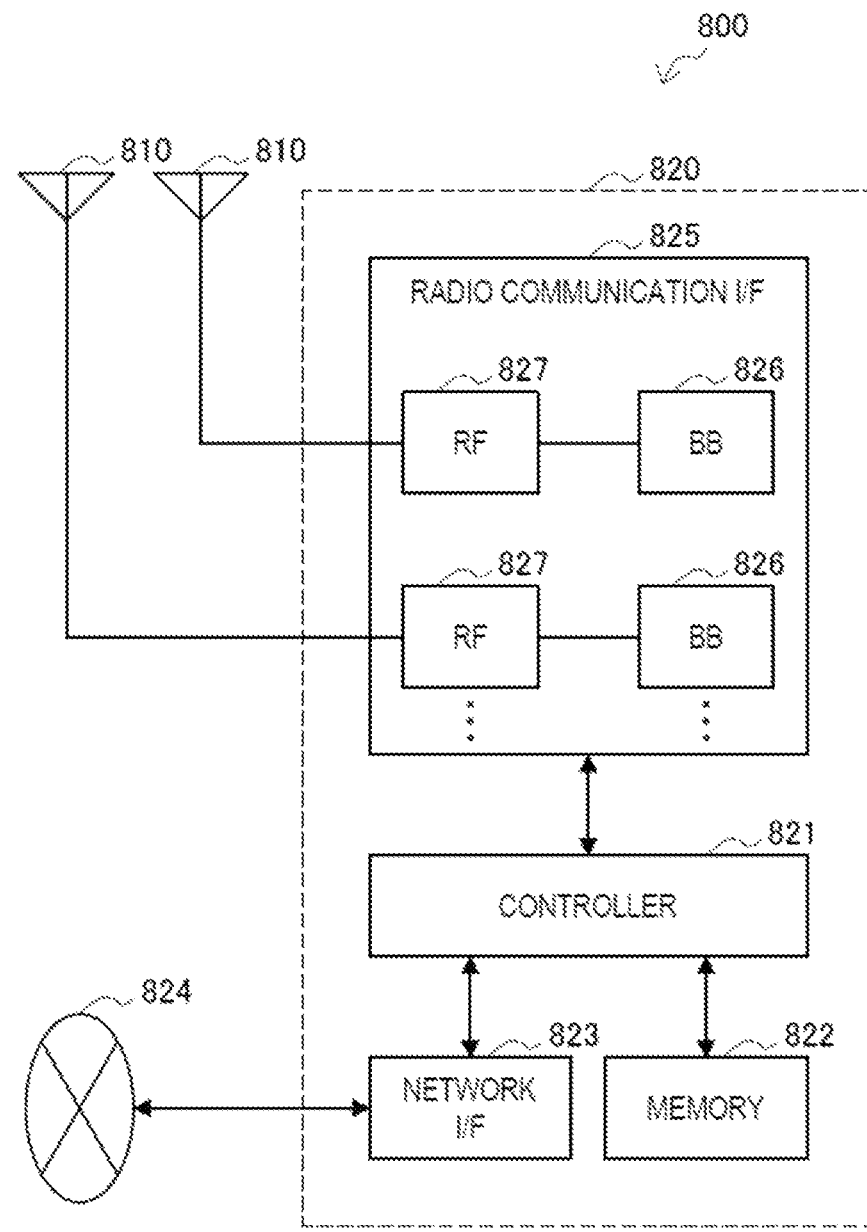
FIG. 22 is a block diagram showing a first example of a schematic configuration of an eNB or a gNB to which the technology of the present disclosure may be applied.

FIG. 22 is a block diagram showing a first example of an exemplary configuration of an eNB or a gNB to which the technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 22, the eNB 800 may include the multiple antennas 810. For example, the multiple antennas 810 may be compatible with multiple frequency bands used by the eNB 800. Although FIG. 22 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an Si interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 22, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 22. For example, the multiple RF circuits 827 may be compatible with multiple antenna elements. Although FIG. 22 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 22, the communication unit of the electronic apparatus 400 may be implemented by the radio communication interface 825. At least a part of the functions may be implemented by the controller 821. For example, the controller 821 may detect non-coordination interferences on a specified channel by performing functions of the monitoring unit 401 and the providing unit 402.

Second Application Example

Figure 23:
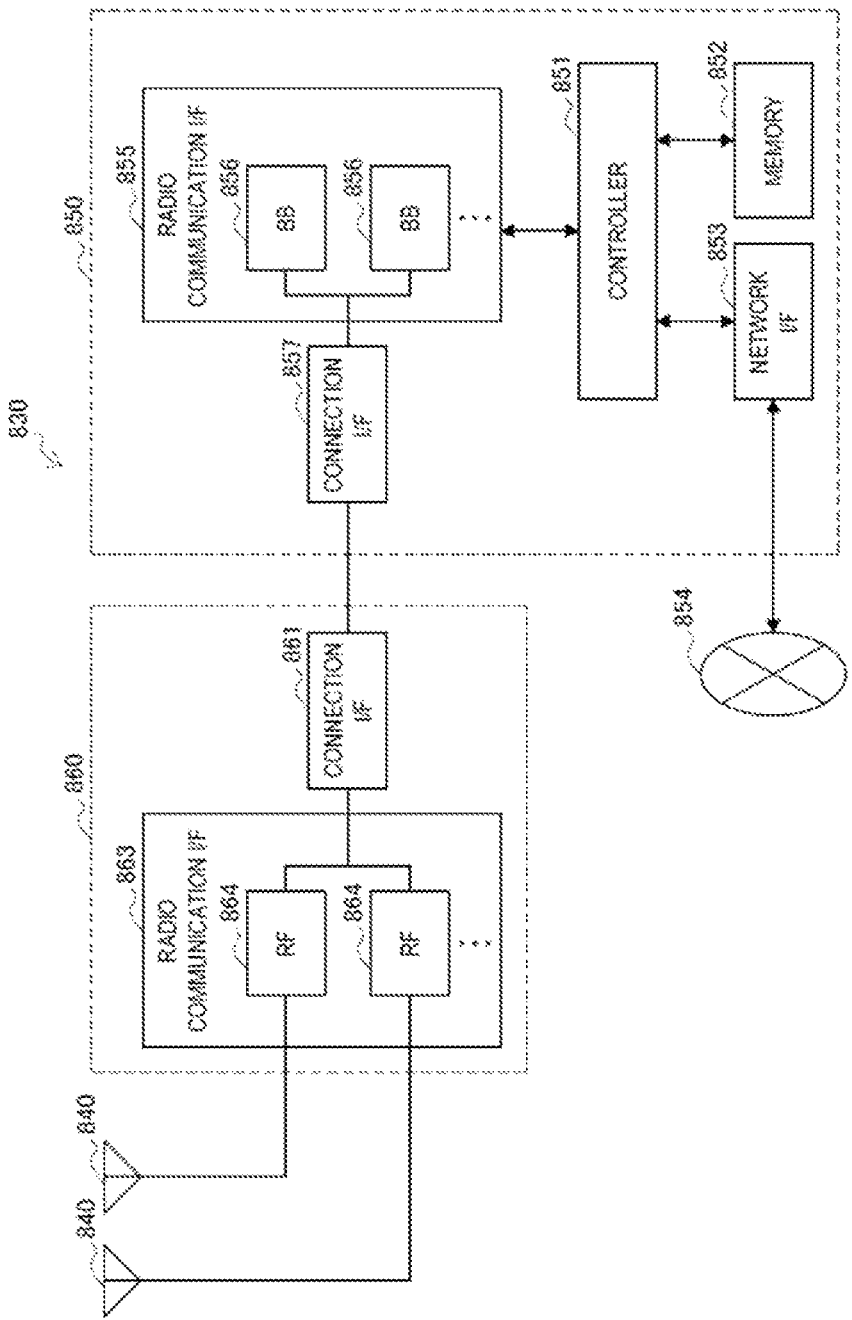
FIG. 23 is a block diagram showing a second example of a schematic configuration of an eNB or a gNB to which the technology of the present disclosure may be applied.

FIG. 23 is a block diagram showing a second example of an exemplary configuration of the eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860.

The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 23, the eNB 830 may include the multiple antennas 840. For example, the multiple antennas 840 may be compatible with multiple frequency bands used by the eNB 830. Although FIG. 23 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 22.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 22, except that the BB processor 856 is connected to an RF circuit 864 of the RRH 860 via the connection interface 857. As show in FIG. 23, the radio communication interface 855 may include the multiple BB processors 856. For example, the multiple BB processors 856 may be compatible with multiple frequency bands used by the eNB 830. Although FIG. 23 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 23. For example, the multiple RF circuits 864 may support multiple antenna elements. Although FIG. 23 shows the example in which the radio communication interface 863 includes the multiple RF circuits 864, the radio communication interface 863 may also include a single RF circuit 864.

In the eNB 830 shown in FIG. 23, the communication unit of the electronic apparatus 400 may be implemented by a radio communication interface 825. At least a part of functions may be implemented by the controller 821. For example, the controller 821 may detecting the non-coordination interferences on a specified channel by performing functions of the monitoring unit 401 and the providing unit 402.

[Application Example Regarding User Equipment]

First Application Example

Figure 24:
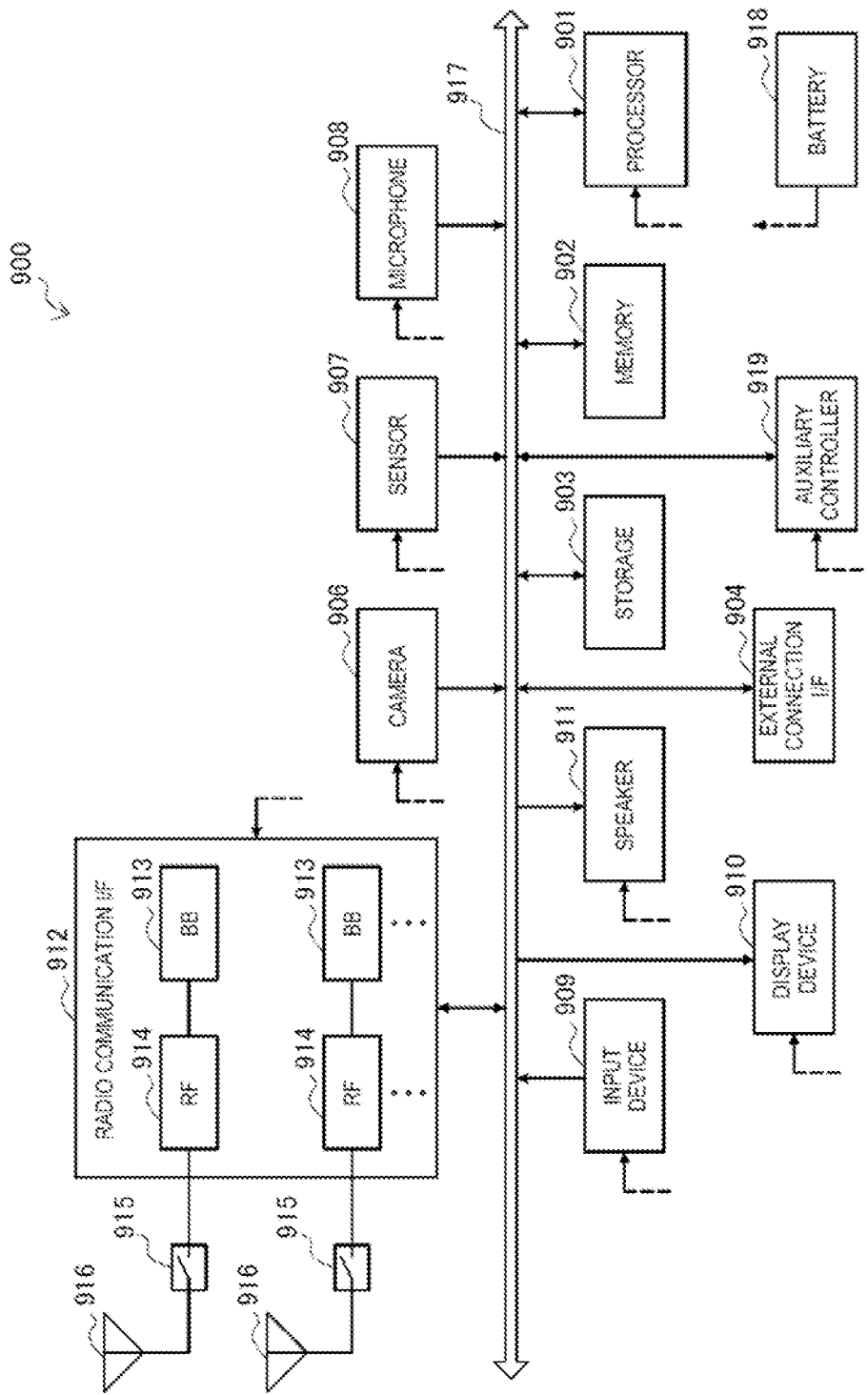
FIG. 24 is a block diagram showing an example of a schematic configuration of a smartphone to which the technology according to the present disclosure may be applied.

FIG. 24 is a block diagram illustrating an example of exemplary configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 24 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 24. Although FIG. 24 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 24. Although FIG. 24 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 24 via feeder lines that are partially shown as dashed lines in FIG. 24. The auxiliary controller 919, operates a minimum necessary function of the smart phone 900, for example, in a sleep mode.

In the smartphone 900 shown in FIG. 24, the communication unit of the electronic apparatus 200 may be implemented by the radio communication interface 912. At least a part of functions may be implemented by the processor 901 or the auxiliary controller 919. For example, the processor 901 or the auxiliary controller 919 may detect the non-coordination interferences on a specified channel by performing functions of the monitoring unit 401 and the providing unit 402.

Second Application Example

Figure 25:
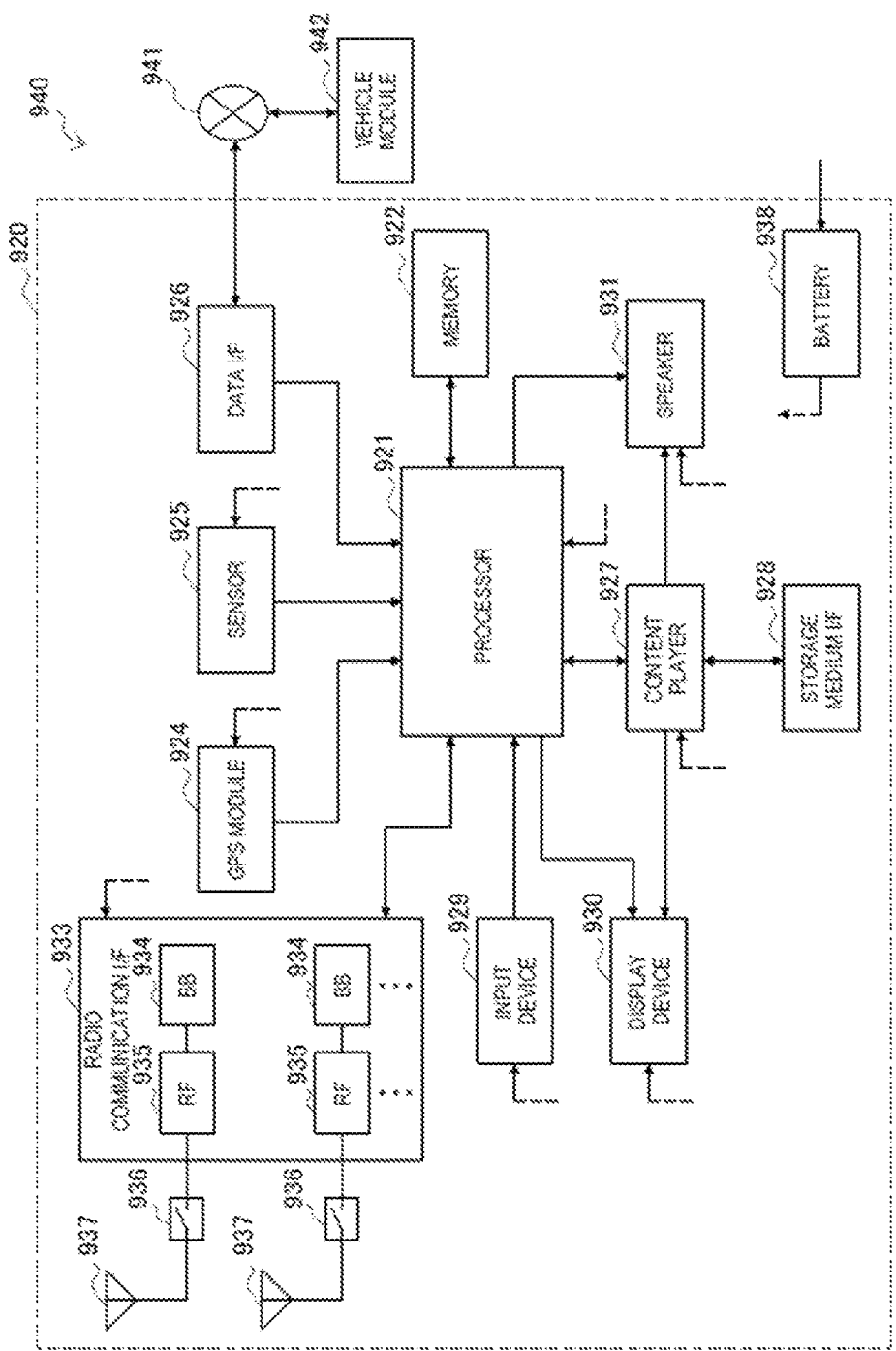
FIG. 25 is a block diagram showing an example of a schematic configuration of a car navigation device to which the technology of the present disclosure may be applied.

FIG. 25 is a block diagram showing an example of a schematic configuration of a car navigation device 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sounds for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 25. Although FIG. 25 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 25, the car navigation apparatus 920 may include the multiple antennas 937. Although FIG. 25 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 25 via feeder lines that are partially shown as dash lines in FIG. 25. The battery 938 accumulates power supplied from the vehicle.

In the car navigation apparatus 920 shown in FIG. 25, the communication unit of the electronic apparatus 200 may be implemented by the radio communication interface 912. At least a part of functions may be implemented by the processor 901 or the auxiliary controller 919. For example, the processor 901 or the auxiliary controller 919 may detect non-coordination interferences on a specified channel by performing functions of the monitoring unit 401 and the providing unit 402.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2600 shown in FIG. 26) from a storage medium or network, wherein the computer is capable of implementing various functions when installed with various programs.

Figure 26:
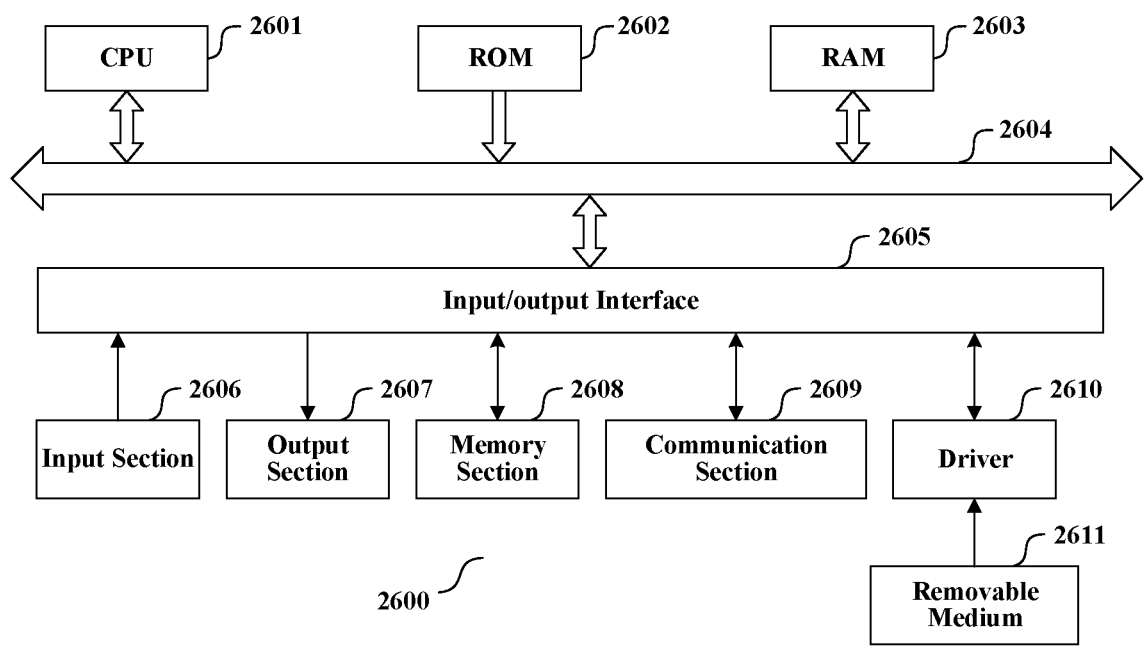
FIG. 26 is a block diagram of an exemplary block diagram illustrating the structure of a general purpose personal computer capable of realizing the method and/or device and/or system according to the embodiments of the present disclosure

In FIG. 26, a central processing unit (CPU) 2601 executes various processing according to a program stored in a read-only memory (ROM) 2602 or a program loaded to a random access memory (RAM) 2603 from a memory section 2608. The data needed for the various processing of the CPU 2601 may be stored in the RAM 2603 as needed. The CPU 2601, the ROM 2602 and the RAM 2603 are linked with each other via a bus 2604. An input/output interface 2605 is also linked to the bus 2604.

The following components are linked to the input/output interface 2605: an input section 2606 (including keyboard, mouse and the like), an output section 2607 (including displays such as a cathode ray tube (CRT), a liquid crystal display (LCD), a loudspeaker and the like), a memory section 2608 (including hard disc and the like), and a communication section 2609 (including a network interface card such as a LAN card, modem and the like). The communication section 2609 performs communication processing via a network such as the Internet. A driver 2610 may also be linked to the input/output interface 2605, if needed. If needed, a removable medium 2611, for example, a magnetic disc, an optical disc, a magnetic optical disc, a semiconductor memory and the like, may be installed in the driver 2610, so that the computer program read therefrom is installed in the memory section 2608 as appropriate.

In the case where the foregoing series of processing is achieved through software, programs forming the software are installed from a network such as the Internet or a memory medium such as the removable medium 2611.

It should be appreciated by those skilled in the art that the memory medium is not limited to the removable medium 2611 shown in FIG. 26, which has program stored therein and is distributed separately from the apparatus so as to provide the programs to users. The removable medium 2611 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2602 and the memory section 2608 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n)" in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
a transceiver; and
processing circuitry, configured to:
acquire, from a monitoring node within a geographic management region, a monitoring result of the monitoring node with respect to a specified channel,
wherein the specified channel is a channel, of plural channels, having a highest probability of there being non-coordination interferences, a probability of there being non-coordination interferences being estimated for each of the plural channels based on historical channel utilization data of nodes operating on each of the plural channels in the geographic management region;
determine, based on the monitoring result, that there is a current non-coordination interference on the specified channel,
select the monitoring node within the geographic management region based on effective distances between respective nodes in the geographic management region and a critical position in the geographic management region,
wherein, the critical position is a position in the geographic management region at which the non-coordination interferences are to be monitored, and the effective distance is obtained based on a physical distance between the monitoring node and the critical position and a load factor of the monitoring node,
wherein the load factor of the monitoring node is a ratio between a current load of the monitoring node and a maximum load bearable by the monitoring node;
select a node in the geographic management region with the smallest effective distance to the critical position as the monitoring node;
extract a feature of the current non-coordination interference from the monitoring report; and perform an interference mitigation process based on the extracted feature, the interference mitigation process comprising one of:
adjusting a spectrum, a beam or a power emitting level for a user which is affected by the current non-coordination interference; or
obtaining an additional spectrum resource for the user which is affected by the current non-coordination interference from a spectrum management apparatus; or
requesting that the spectrum management apparatus manage an attribute of a node responsible for the current non-coordination interference in order to reduce the current non-coordination interference,
wherein the processing circuitry is further configured to:
select the specified channel based on the historical channel utilization data of the nodes as follows:
perform predictive scoring on each channel, based on historical channel utilization status by the monitoring node and historical channel utilization status by at least a part of neighboring nodes of the monitoring node, and
based on the predictive scoring, select N channels with a highest predictive score as the specified channel, and
wherein the processing circuitry is configured to perform the predictive scoring on the channel as follows:
acquire, based on a historical channel utilization status for each channel, historical channel utilization scores for each channel by the monitoring node and historical channel utilization scores for neighboring nodes of the monitoring node;

calculate, based on the historical channel utilization scores, score similarities between the monitoring node and the neighboring nodes of the monitoring node, and select at least one of the neighboring nodes of which the score similarities meet a predetermined condition as the at least a part of the neighboring nodes; and perform predictive scoring on the channel according to the historical channel utilization scores of the monitoring node and the historical channel utilization scores of the selected at least one of the neighboring nodes.

2. The electronic apparatus according to claim 1, wherein the critical position comprises at least one of the following positions: a position of a primary user, a position of a secondary user which is protected, or an overlapping region between different common channel groups (CCGs).

3. The electronic apparatus according to claim 1, wherein the processing circuitry is further configured to:
dynamically select the monitoring node based on a variation of loads of the nodes; and
select the monitoring node according to a monitoring capability of each node.

4. The electronic apparatus according to claim 1, wherein the processing circuitry is further configured to generate information indicating being selected as the monitoring node to be provided to the selected monitoring node and acquire a corresponding response from the monitoring node.

5. The electronic apparatus according to claim 1, wherein the processing circuitry is configured to determine whether there are non-coordination interferences by comparing a value of the accumulated interferences detected on the specified channel and a predetermined interference tolerance.

6. The electronic apparatus according to claim 1, wherein the processing circuitry is configured to determine, based on an interference noise ratio (INR) of the monitored specified channel, whether there are non-coordination interferences on the specified channel by judging whether a difference between the monitored INR and a calculated INR in the case of no non-coordination interferences exceeds a predetermined threshold.

7. The electronic apparatus according to claim 6,
wherein the processing circuitry is configured to determine whether there are non-coordination interferences on the specified channel by comparing the monitored INR and an INR threshold set based on the historical channel utilization data of the nodes, and
wherein the feature of the non-coordination interferences comprises each of an interference bandwidth, the INR, a type of an interference signal, and a time when the non-coordination interferences occur.

8. A method for wireless communications, the method performed by a electronic apparatus and comprising:
acquiring, from a monitoring node within a geographic management region, a monitoring result of the monitoring node with respect to a specified channel,
wherein the specified channel is a channel, of plural channels, having a highest probability of there being non-coordination interferences, a probability of there being non-coordination interferences being estimated for each of the plural channels based on historical channel utilization data of nodes operating on each of the plural channels in the geographic management region;

determining, based on the monitoring result, that there is a current non-coordination interference on the specified channel,
wherein the monitoring node is selected within the geographic management region based on effective distances between respective nodes in the geographic management region and a critical position in the geographic management region,
wherein the critical position is a position in the geographic management region at which the non-coordination interferences are to be monitored, and the effective distance is obtained based on a physical distance between the monitoring node and the critical position and a load factor of the monitoring node,
wherein the load factor of the monitoring node is a ratio between a current load of the monitoring node and a maximum load bearable by the monitoring node;
selecting a node in the geographic management region with the smallest effective distance to the critical position as the monitoring node;
extracting a feature of the current non-coordination interference from the monitoring report; and
performing an interference mitigation process based on the extracted feature, the interference mitigation process comprising one of:
adjusting a spectrum, a beam or a power emitting level for a user which is affected by the current non-coordination interference; or
obtaining an additional spectrum resource for the user which is affected by the current non-coordination interference from a spectrum management apparatus; or
requesting that the spectrum management apparatus manage an attribute of a node responsible for the current non-coordination interference in order to reduce the current non-coordination interference,
wherein the method further comprises:
selecting the specified channel based on the historical channel utilization data of the nodes as follows:
performing predictive scoring on each channel, based on historical channel utilization status by the monitoring node and historical channel utilization status by at least a part of neighboring nodes of the monitoring node, and
based on the predictive scoring, selecting N channels with a highest predictive score as the specified channel, and
wherein method further comprises performing the predictive scoring on the channel as follows:
acquiring, based on a historical channel utilization status for each channel, historical channel utilization scores for each channel by the monitoring node and historical channel utilization scores for neighboring nodes of the monitoring node;
calculating, based on the historical channel utilization scores, score similarities between the monitoring node and the neighboring nodes of the monitoring node, and selecting at least one of the neighboring nodes of which the score similarities meet a predetermined condition as the at least a part of the neighboring nodes; and
performing predictive scoring on the channel according to the historical channel utilization scores of the monitoring node and the historical channel utilization scores of the selected at least one of the neighboring nodes.

\* \* \* \* \*